(12) United States Patent
Miller et al.

(10) Patent No.: US 7,612,675 B2
(45) Date of Patent: Nov. 3, 2009

(54) RFID—SENSOR SYSTEM FOR LATERAL DISCRIMINATION

(76) Inventors: Ronald N. Miller, 96 Scenic Millway, Toronto, Ontario (CA) M2L 1S7; Christian Richard, 203 Lagace, Dorval, Quebec (CA) H9S 2L9

( * ) Notice: Subject to any disclaimer, the term of this patent is extended or adjusted under 35 U.S.C. 154(b) by 333 days.

(21) Appl. No.: 11/674,736

(22) Filed: Feb. 14, 2007

(65) Prior Publication Data
US 2007/0194931 A1 Aug. 23, 2007

Related U.S. Application Data

(60) Provisional application No. 60/744,467, filed on Apr. 7, 2006, provisional application No. 60/772,995, filed on Feb. 14, 2006.

(51) Int. Cl.
*G08B 13/14* (2006.01)
*H04Q 5/22* (2006.01)
(52) U.S. Cl. .................................. 340/572.3; 340/10.4
(58) Field of Classification Search ... 340/572.1–572.9, 340/10.1–10.6; 455/1
See application file for complete search history.

(56) References Cited

U.S. PATENT DOCUMENTS

| 5,651,548 A | 7/1997 | French et al. |
| 5,735,742 A | 4/1998 | French |
| 6,429,768 B1 * | 8/2002 | Flick ........................... 340/5.2 |
| 7,006,039 B2 * | 2/2006 | Miyamoto et al. .......... 342/370 |
| 7,253,717 B2 * | 8/2007 | Armstrong et al. ......... 340/10.2 |
| 2004/0100359 A1 * | 5/2004 | Reade et al. ................. 340/5.2 |
| 2005/0212673 A1 * | 9/2005 | Forster ..................... 340/572.7 |

FOREIGN PATENT DOCUMENTS

EP 1505531 10/2001

* cited by examiner

*Primary Examiner*—Jennifer Mehmood
(74) *Attorney, Agent, or Firm*—Daniel P. Malley; Bond, Schoeneck & King, PLLC

(57) ABSTRACT

The present invention is directed to a system for reading at least one object having a programmable RFID device embedded therein. The object is disposed in a predetermined reading region. The system includes a reader loop disposed in the predetermined reading region. The reader loop is configured to transmit a reader interrogation signal to the at least one object disposed in the predetermined reading region and receive an RFID signal from the at least one object in response to the reader interrogation signal. A jamming device is disposed proximate the reader loop. The jamming device is configured to generate a jamming signal that prevents an external reader device disposed outside the predetermined reading region from interrogating the at least one object disposed in the predetermined reading area.

53 Claims, 19 Drawing Sheets

Fig.9 B and C

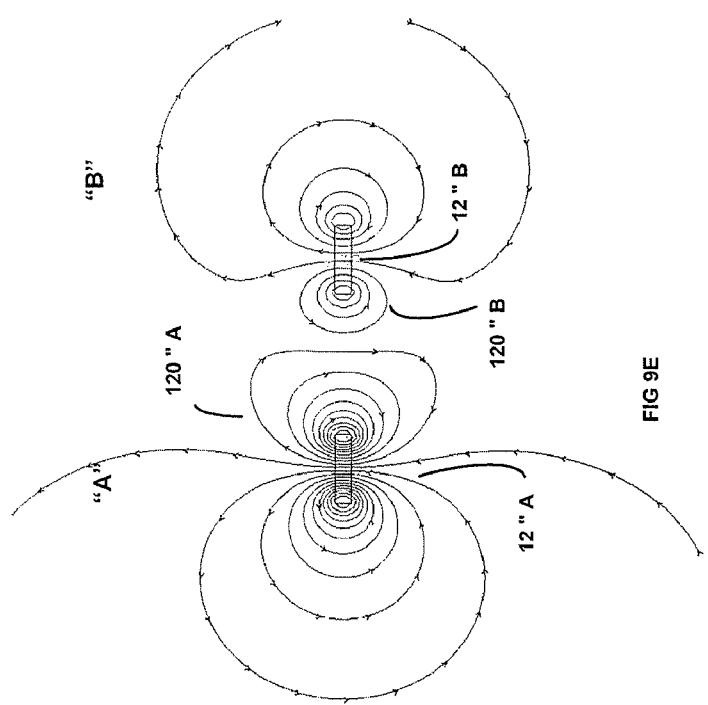
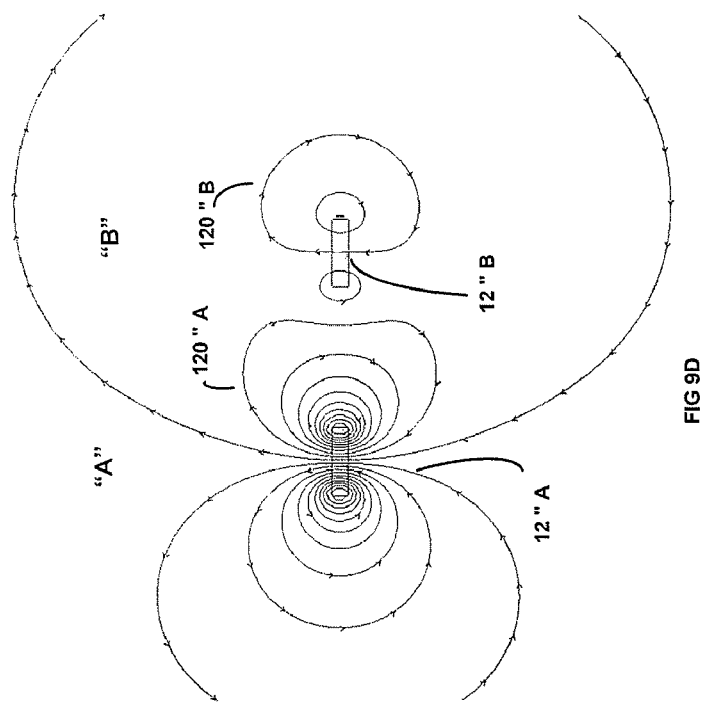
Fig. 9 D and E

FIG. 16 GAMING TABLE BLOCK DIAGRAM

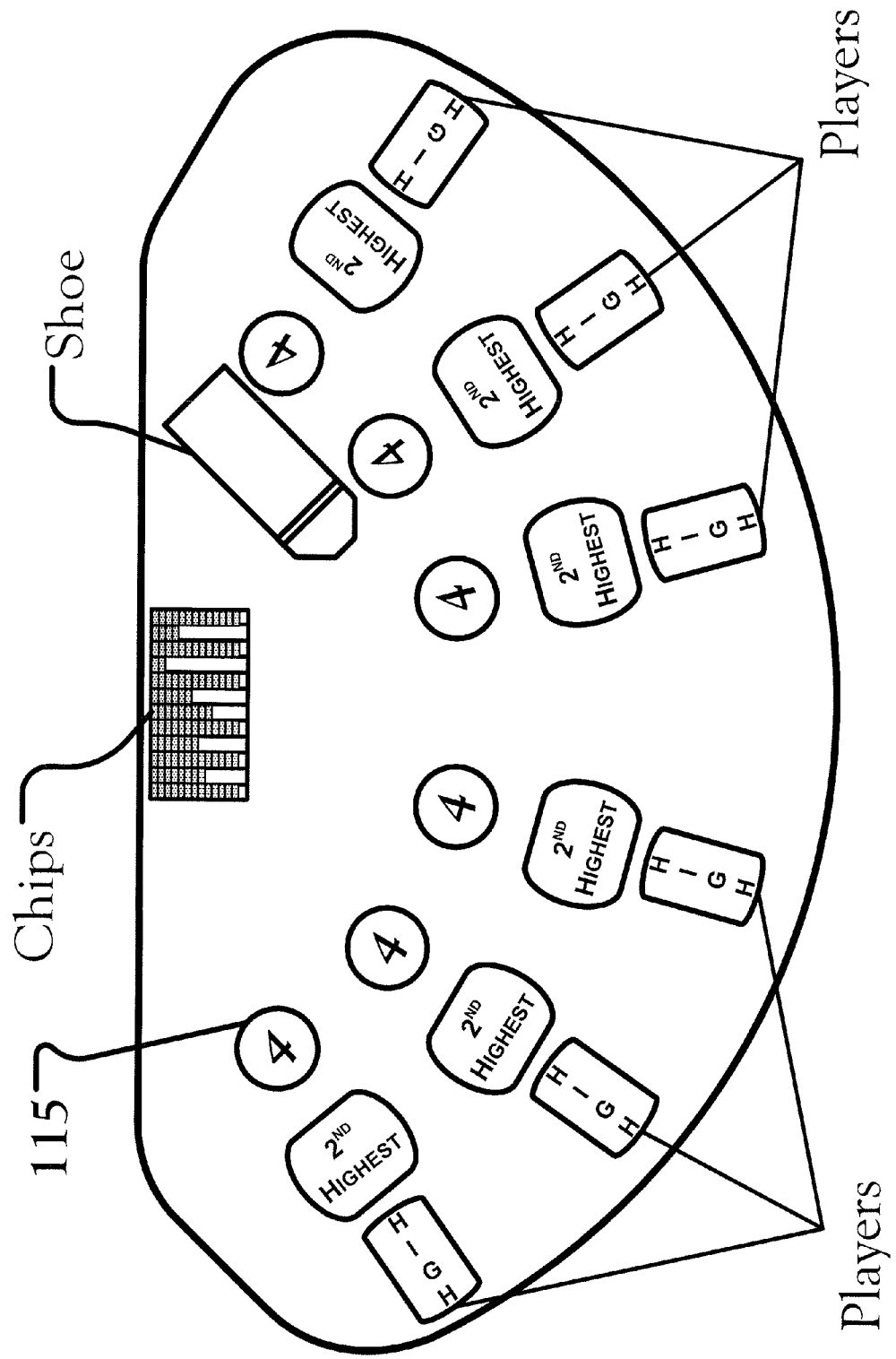
Fig. 21 PAI GOW POKER LAYOUT

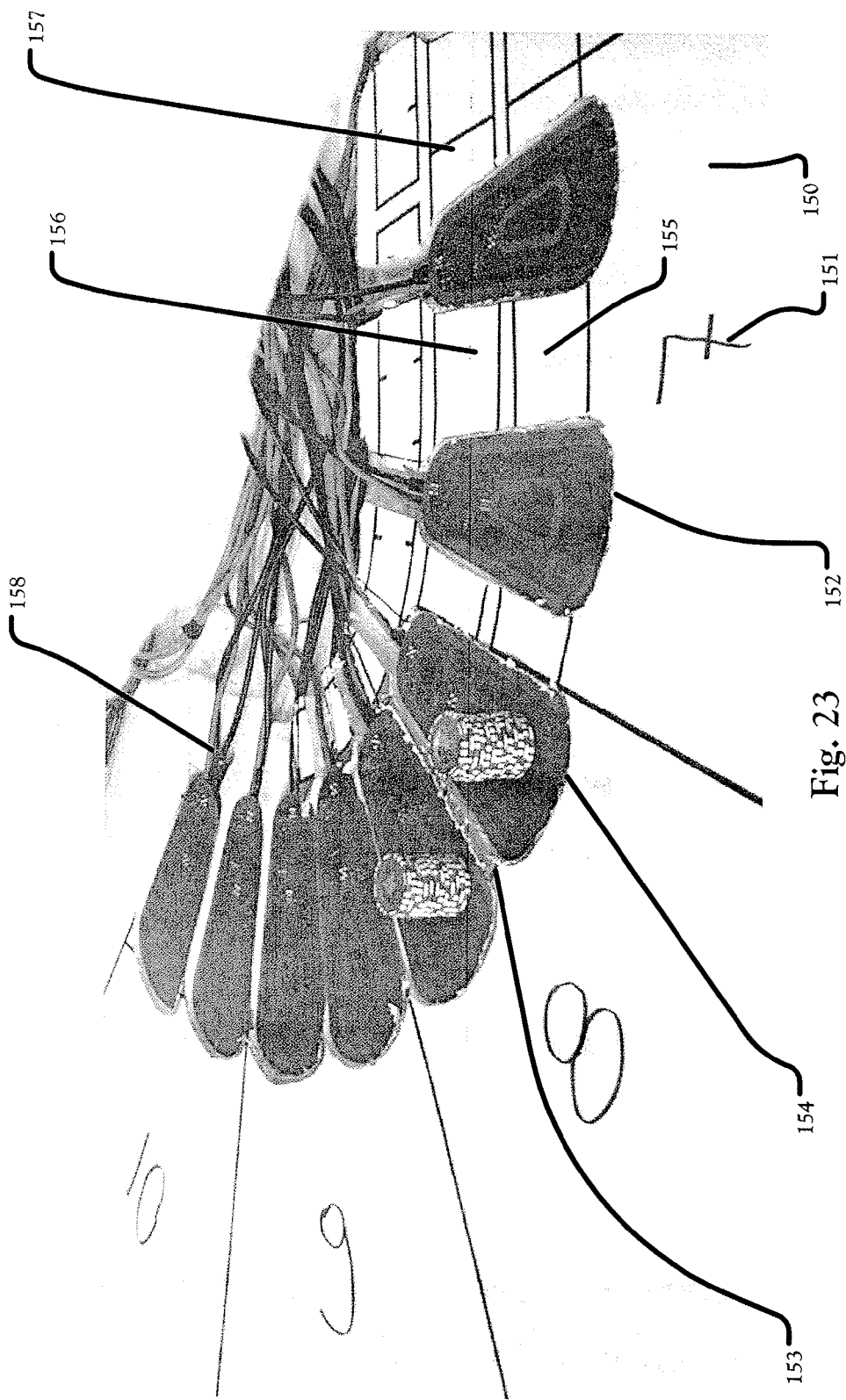

RFID—SENSOR SYSTEM FOR LATERAL DISCRIMINATION

CROSS-REFERENCE TO RELATED APPLICATIONS

This application claims priority under 35 U.S.C. §119(e) to U.S. Provisional Patent Application Ser. No. 60/744,467 filed on Apr. 7, 2006 and U.S. Provisional Patent Application Ser. No. 60/772,995 filed on Feb. 14, 2006, the contents of which are relied upon and incorporated herein by reference in their entirety.

BACKGROUND OF THE INVENTION

1. Field of the Invention

The present invention relates generally to RFID technology, and particularly to HF-RFID coupler sensor systems operating by transformer action.

2. Technical Background

Casino managers are interested in the capability of recording all of the bets being placed within their premises in real time. This requires a precise and reliable means for identifying the various gaming chips disposed inside, or in close proximity to, the betting zones, as delineated by the markings disposed on the surface of the gaming tables. What is needed is the ability to automatically flag in real-time, or in near rear time, any unusual and suspicious events. A system is also needed that continuously tracking the performance of individual players. This system could also be used to assess the short, medium and long-term performance of casino personnel.

When the objects are gaming chips, tokens, or plaques, and the surface is a casino gaming table such as Baccarat, Mini-baccarat, Blackjack or Pai Gow Poker, the demarked areas of interest are called "betting spots" or areas associated with each player's bet. The table top is delineated with graphics and other indicia on a covering material called a "layout". In play and placing bets, the chips may be stacked in columns up to 20 high. For Blackjack, allowance must also be made for the placement of "double down" or "split" bets which are placed just outside the "betting spot". For Baccarat the player betting areas are adjacent and also include adjacent "banker/player/tie" locations.

In one approach, radio frequency identification (RFID) technology has been considered. RFID technology is commonly based on radiated fields (far fields) operating at approved frequencies such as 433 MHz, 915 MHz, 2.4 GHz etc. While promising, this technology has a major drawback. It is not particularly precise in terms of spatial resolution. As a result, its potential is limited to gaming surfaces with single betting areas, such as poker tables, or to tables with betting areas separated by relatively large spaces. Because of both its operating principle and the frequencies at which it operates, this technology is subject to effects that disturb the local field. For example antennas may be detuned by parasitic capacitance (people and metal objects). Signals may be attenuated by the human body. Further, signal propagation may be affected by multi-path phenomena. Accordingly, existing RFID based technology is inadequate when applied to gaming surfaces having multiple betting areas in close proximity to each other, such as the ones used in blackjack or baccarat. The problem is exacerbated when the gaming chips are disposed on the separation lines between betting areas, such as roulette tables.

When automatically communicating with the embedded RFID in each chip responses must be correctly associated with a player location/bet area for this information to be useful to a gaming table system tracking bets and payouts. Accordingly, it is necessary to know the precise location or presence of "tagged objects" within a demarked area. The size covers a few inches of extent and adjacent areas may have contiguous narrow boundaries on the order of ¼ inch. All sensing equipment must be below the table top and out of sight of the players. That is, it is not desired to place couplers, antennas, etc., above the table top.

Thus, some have considered using inductively coupled RFID in the HF frequency band. The terms "Induction field" or "induction coupler" refer to the domain of interacting short range magnetic fields (H fields) that operate by "transformer action" rather than electromagnetic radiation. Magnetic coupling RFID based technology typically operates at approved frequencies in the 125 KHz or 13.56 MHz bands. Because of the inherent "near field" characteristics of this technology, the signal dies off very rapidly beyond the intended coverage area and surrounding environment variations have much less of an impact. In this approach, an RFID inlay, i.e., the "tag," is disposed within the gaming chip. The inlay is an electronics assembly substrate that connects a planar coupler coil or loop and the semiconductor RFID die. Those of ordinary skill in the art will understand that the term "read," or "reading chips," refers to an RFID Reader electronics unit transmitting one or more interrogation messages to the RFID tag disposed within the gaming chip. The interrogation message supplies a wireless "induction field" that provides power to the passive RFID inlay. The class of RFID used is "passive" where tags are powered solely by capturing energy from the Reader-generated impinging field. The RFID inlay receives the interrogation message(s) and provides a response to the reader. These RFID devices also follow the rule of Reader Talks First (RTF).

However, there are drawbacks associated with this approach as well. While the transformer based induction coupler technology represents an improvement over the radiated far-field RFID technology, it is not accurate enough to discriminate between closely spaced betting zones. As noted above, chips may be stacked on top of each other. Any approved system must provide communication with a chip on the top of a stack that may be 25 chips high. The lateral fall-off characteristics of the coupler-generated H field (magnetic field) which can be computed by using the Biot-Savart law. Those of ordinary skill in the art will understand that the magnetic field produced by an embedded loop is roughly spherically shaped. Accordingly, the magnetic field extends approximately the same distance laterally as it does vertically. In particular, the field strength required to reach the top of the chip stack will also result in the field impinging on the neighboring betting spot. This phenomena is commonly referred to as "cross read" or "cross talk."

What is needed is an induction coupling RFID system that addresses the needs described above. In particular, what is needed is an RFID system that is configured to communicate with each chip in a stack of chips that may include 20-25 chips, while simultaneously preventing cross-read or cross-talk. As such, an RFID reader system having a lateral resolution of at least 0.25 inches is required.

SUMMARY OF THE INVENTION

The present invention is directed to an induction coupling RFID system that addresses the needs described above. The RFID system of the present invention provides a magnetic interrogation signal configured to communicate with each chip in a stack of chips that may include 20-25 chips. At the same time, the interrogation signal of the system of the present invention provides a lateral resolution of at least 0.25 inches.

One aspect of the present invention is present invention is directed to a system for reading at least one object having a programmable RFID device embedded therein. The object is disposed in a predetermined reading region. The system includes a reader loop disposed in the predetermined reading region. The reader loop is configured to transmit a reader interrogation signal to the at least one object disposed in the predetermined reading region and receive an RFID signal from the at least one object in response to the reader interrogation signal. A jamming device is disposed proximate the reader loop. The jamming device is configured to generate a jamming signal that prevents an external reader device disposed outside the predetermined reading region from interrogating the at least one object disposed in the predetermined reading area.

In another aspect, the present invention is directed to an RFID sensor system for reading at least one object having a programmable RFID device embedded therein. The at least one object is disposed in at least one of N-predetermined reading regions. N is an integer value greater than or equal to two. The system includes N-RFID reader arrays. Each RFID reader array is disposed in a corresponding one of the N-predetermined reading regions. Each $M^{th}$ RFID reader array of the N-reader arrays includes an $M^{th}$ reader loop configured to read the at least one object disposed in the $M^{th}$ region and an $M^{th}$ jamming device disposed proximate the $M^{th}$ reader loop. The $M^{th}$ jamming device is configured to generate a jamming signal that prevents reader loops disposed in adjacent reading regions of the N-predetermined reading regions from reading the at least one object disposed in the $M^{th}$ region. M is an integer value in a range of integers from 1 to N. A control system is coupled to the N-RFID reader arrays. The control system is configured to energize each reader loop in accordance with a predetermined reading sequence and energize each jamming device in accordance with a predetermined jamming sequence.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIGS. 18-21 are example applications in accordance with an embodiment of the present invention;
FIG. 23 is a perspective view of a coupler arrangement applied to a baccarat table in accordance with an embodiment of the present invention.

DETAILED DESCRIPTION

Figure 1:
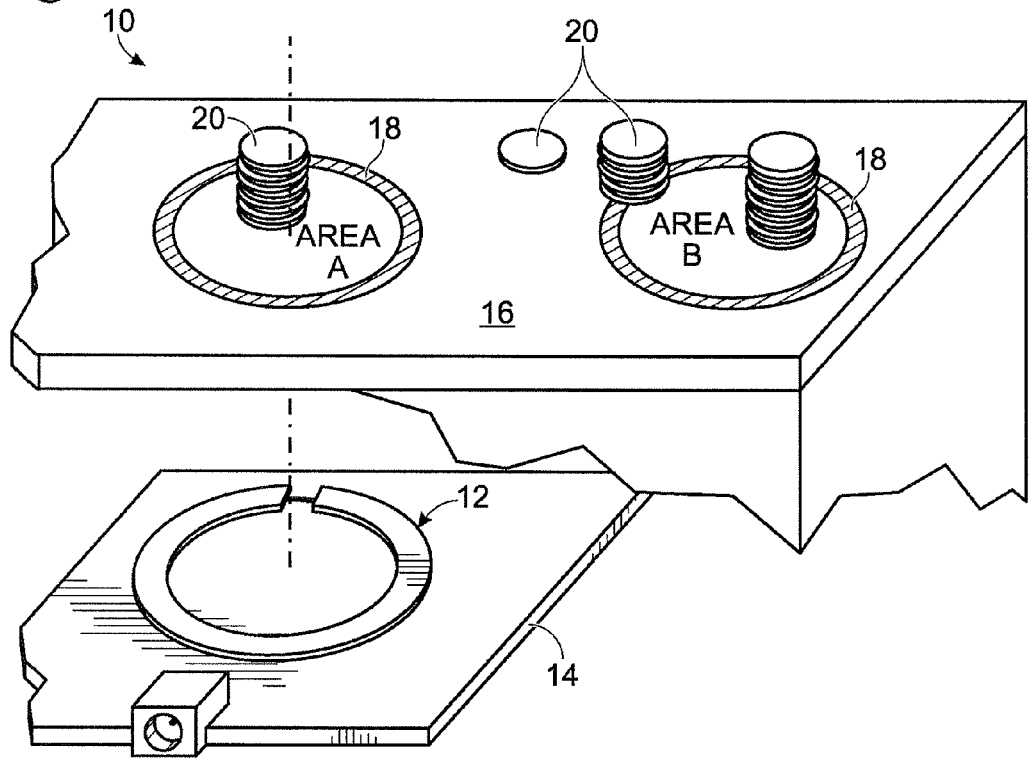
FIG. 1 is a schematic illustration of a gaming table.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the system of the present invention is shown in FIG. 1, and is designated generally throughout by reference numeral 10.

Generally stated, a method and apparatus according to illustrative embodiments of the present invention provide improved spatial resolution of magnetic coupling RFID technology used to identify the position of chips on precisely defined betting areas on a gaming surface, such as, for example, a gaming table. The method and apparatus provide gaming surface modifications which allow the use of magnetically coupled RFID gaming chips where tight spacing is needed and no "cross reading" of chips in other betting zones is desired. The use of "active field control" methods that consist of jamming loops, field shaping loops, ferrite solenoids and enhanced RFID measurements within the chip are described.

Referring to FIG. 1, a common gaming surface which uses magnetic coupling technology is shown in the form of a gaming table 10 having betting areas A and B. The basic components of the gaming table 10 include a coil inductive coupler 12 with corresponding electronic circuitry 14 associated with each betting area (for the sake of clarity only those of betting area A are shown), a protective cover 16 with betting area markings 18 applied thereon and gaming chips 20, all of which will be further detailed below.

The coiled inductive coupler 12, referred to as the primary coil, is installed within the gaming table 10 and produces the read zone covering its associated betting area A, B within which gaming chips 20 have to be identified and counted.

The electronic circuitry 14 produces the current flowing through the primary coil 12 and interprets (reads) the different signals induced by magnetic coupling in the primary coil 12 by gaming chips 20 placed inside an associated betting area A, B.

The protective cover 16, which may be, for example, a plastic sheet with felt carpeting, covers the primary coil 12 and its corresponding electronic circuitry 14, and also provides a surface on which the betting area markings 18 may be applied and the chips 20 placed.

Each of the gaming chips 20 integrate a coiled inductive coupler, referred to as the secondary coil, through which currents induced by magnetic coupling from the gaming table 10 primary coil 12 and by the other gaming chips 20 secondary coils flow, and an integrated circuit containing the appropriate gaming chip identification data, the circuit being capable of generating signals which may be used to transmit such data by magnetic coupling.

It is to be understood that although the primary coil 12 and complementary electronic circuitry 14 of betting area A have been discussed, the same apply to any other betting area such as, for example, betting area B.

Figure 2:
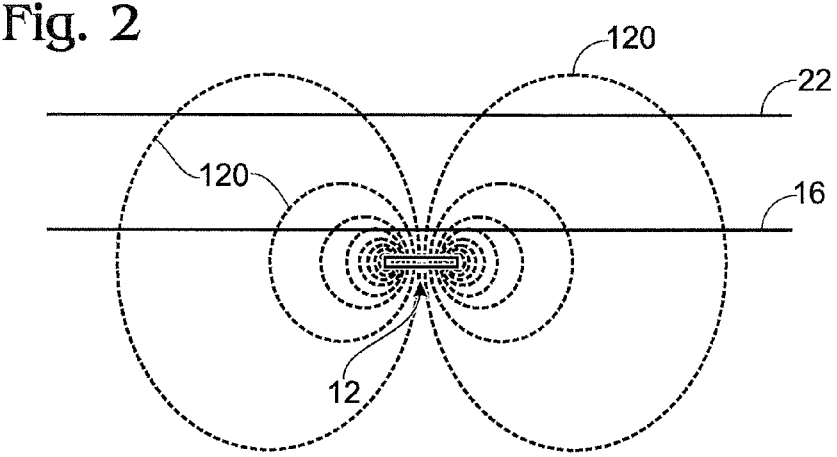
FIG. 2 is a diagram of the magnetic flux lines of a coiled inductive coupler.
Figure 3:
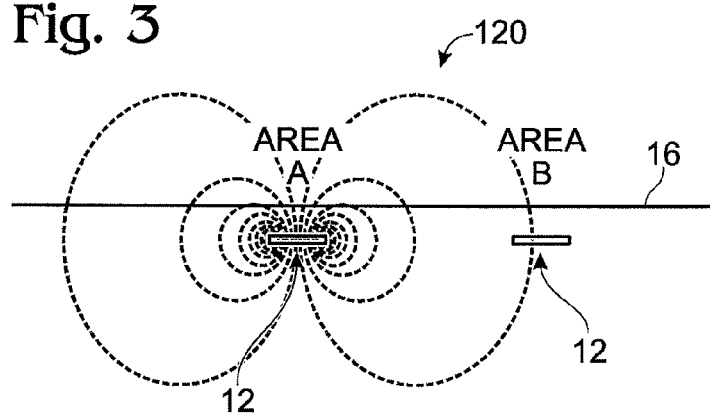
FIG. 3 is a diagram of the magnetic flux densities of a coiled inductive coupler.

Referring to FIG. 2, the magnetic flux 120 produced by the primary coil 12 is roughly spherically shaped and its "drop-off" characteristics are determined by physics and may be expressed in dB/mm. To extend itself high enough to read chips at the top of a stack, such as the height of a 25 chip stack identified by line 22, the magnetic field inevitably has to extend laterally as well. This implies that when the diagonal of the betting area is smaller than the height of the top of a 25 chip stack, and that an adjacent betting area is situated quite close to the observed betting area, it is generally impossible to achieve the required "drop off" characteristics. Referring now to FIG. 3, it may be seen that the magnetic flux 120 produced by the primary coil 12 of betting area A extends laterally, although with reduced density, into adjacent betting are B.

In order to achieve improved chip 20 position measurement (0.5 inch or better), especially when the specification calls for stacks of up to 25 chips 20, magnetic coupling technology may be combined with one or more complementary components and method of use thereof, either based on active field control using jamming coils or ferrite induced field deformation or on additional measurement techniques, such as received signal strength information (RSSI).

Figure 4:
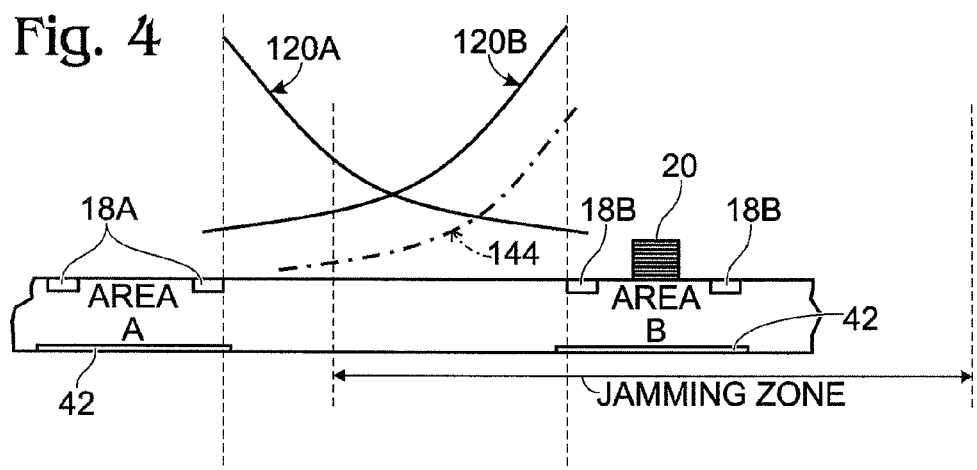
FIG. 4 is a schematic representation of the jamming concept.
Figure 5:
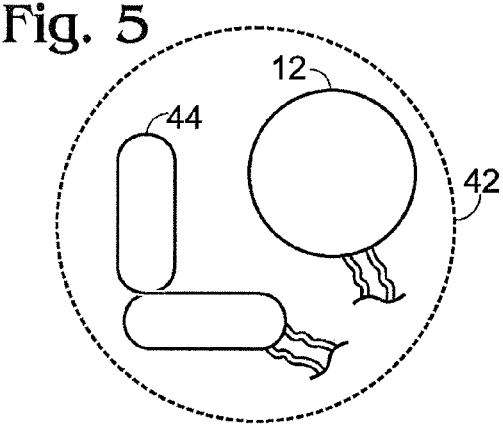
FIG. 5 is a schematic representation of a coil set used in the jamming concept of FIG. 4.
Figure 6:
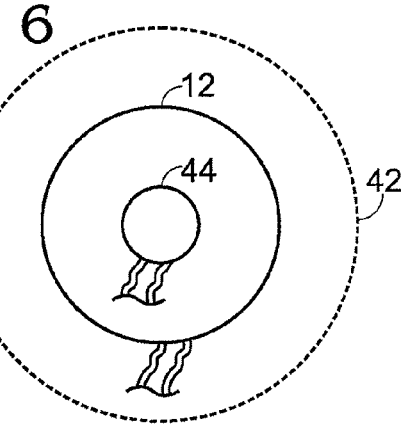
FIG. 6 is a schematic representation of an alternative coil set used in the jamming concept of FIG. 4.

Referring to FIGS. 4, 5 and 6, coil sets 42 comprising a primary coil 12, referred to as the "read" coil, and one or more jamming coils 44, one such set 42 being associated with each betting area A, B, may be used. To identify the gaming chips 20 within a specific betting area, the jamming coils 44 of all or some of the coil sets 42 are activated apart from the set situated in the betting area being observed. By cyclically multiplexing the jamming coils 44, so as to serially observe each of the betting areas A, B; it is possible to precisely draw the complete picture of the bets on the gaming table 10 (or any other gaming surface). The jamming coils 44 may be "lateral" i.e. adjacent to and in the same plane as the read coil 12, such as shown in FIG. 5, or concentric to and in the same plane as the read coil 12, such as shown in FIG. 6. When concentric jamming coils 44 are used, two "read" operations are required; one when the jamming coils 44 are energized and one when they are not. The gaming chips 20 in the betting area may be found by subtracting the two lists of chips 20 obtained.

In a first illustrative embodiment, shown in FIG. 5, the jamming coil 44 is adjacent and in the same plane as the read coil 12, and is in the form of circuit loops of various geometries, which may include field canceling crossover patterns referred to as a "jammer loop".

In another illustrative embodiment, the coil set 42 may comprise a first circular, oval or square read coil 12 with a second concentric circular, oval or square jamming coil 44, which is in the same plane and co-axial to the read coil 12. FIG. 6 shows an example where both the read coil 12 and jamming coil 44 are concentric circular coils.

In a further illustrative embodiment (not shown), the coil set 42 may comprise an auxiliary coil associated with the read coil 12, actively energized and phase coherent with the read coil 12 excitation, to shape the magnetic field of the read coil 12.

Read coils 12 in the gaming table 10 (or other gaming surface) are used to sense chips 20 in the betting areas A, B associated with each read coil 12 and are scanned in turn by a multiplexer. Associated with each read coil 12 are jamming coils 44 disposed as described above. The jamming coils 44 are activated to help restrict the reading zone of the read coil 12 by either splitting the signal and shaping the resulting field pattern or by generating a separate independent jamming signal. Referring back to FIG. 4, there is shown the read coil flux 120A associated with betting area A and the read coil flux 120B associated with betting area B. As it may be seen, when activated the read coil 12 of betting area A generates a flux 120A that extends into betting area B delimited by betting area markings 18B. When activated, the jamming coil 44 of betting area B generates a jamming flux 144 that prevents the chips 20 that are in Area B from responding to the read signals from betting area A coil 12. Also the relative levels of the jamming signals and read signals may be set adaptively by sensing the "jammer effectiveness" on fixed chips permanently installed in various locations within the gaming table surface and controlling the jammer and reader levels either on initial set-up or periodically during use. The jamming signal 144 may only be, for example, an in-band 13.56 MHz continuous wave (CW) signal at a level or 10 dB below the normal reader coil 12 received level. It is to be understood that other jamming modulations are possible depending on the RFID chip technology used.

A further method is to use jamming coils 44 of various shapes to produce local area jamming signals that prevent chips 20 outside of the betting area being read from hearing and responding to the interrogation signals of the reader coil 12.

Using multiple active coils or specially shaped ferrite solenoids modifies the gaming surface 16 magnetic field so as to increase the drop-off slope around each betting area, A, B. By doing so the magnetic field around each betting area A, B may actually assume a more "rectangular shape" rather than "quasi-spherical". Moreover, by combining this technique with the multiplexing of the active coils or the solenoids it may also be possible to further enhance the position accuracy of this improvement.

Figure 7:
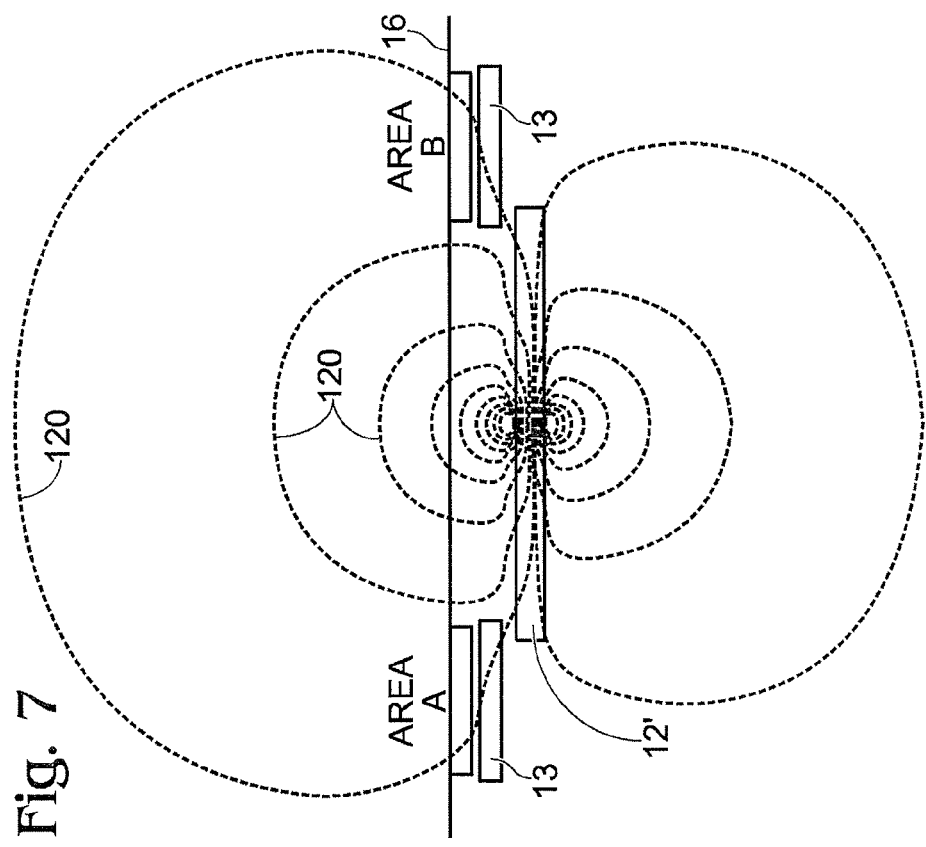
FIG. 7 is a diagram of the magnetic flux lines of a ferrite solenoid combined with ferrite director material.

In a first illustrative embodiment, shown in FIG. 7, a horizontal ferrite solenoid rod 12' is used, instead of a coiled inductive coupler, below the plane of the gaming surface 16 and is placed in between two betting areas, here betting areas A and B. This construction produces a magnetic flux pattern 120 such that it passes perpendicularly up through one read zone (for example betting area B) and down through a second laterally adjacent read zone (for example betting area A). A ferrite director material 13 may be placed horizontally beneath the gaming surface 16 under each betting area A, B to widen the magnetic flux 120.

Figure 8:
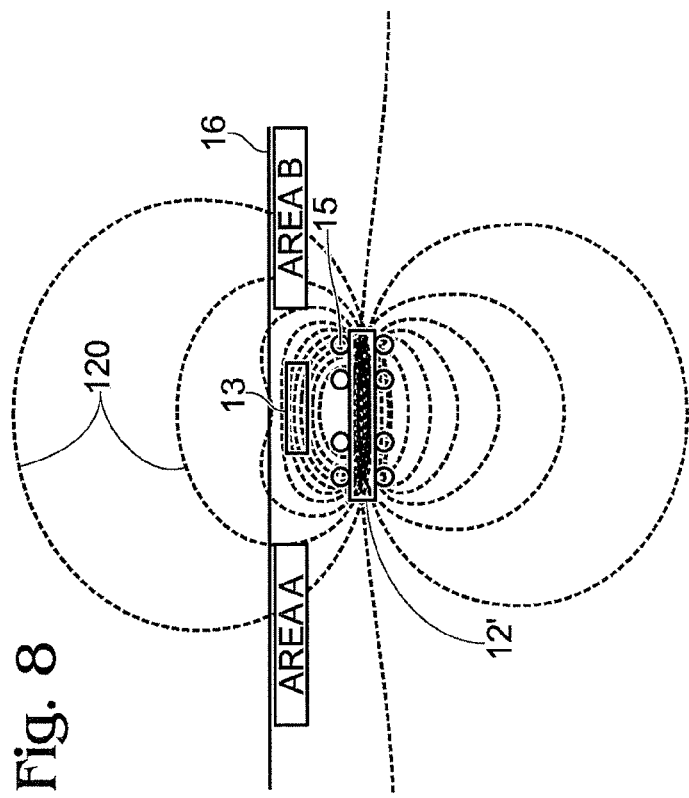
FIG. 8 is a diagram of the magnetic flux lines of a wounded ferrite solenoid combined with a ferrite field flattening plate.

In another illustrative embodiment, shown in FIG. 8, a specially shaped ferrite solenoid 12' with an excitation winding 15 is used, instead of a coiled inductive coupler 12, below the plane of the gaming surface 16 and is placed in between two betting areas, here betting areas A and B. This construction produces a magnetic flux pattern 120 such that it passes perpendicularly up through one read zone (for example betting area B) and down through a second laterally adjacent read zone (for example betting area A). A ferrite director material 13 may be placed between the adjacent read zones, here betting areas A and B, to help ensure that the lines of magnetic flux 120 are more horizontal in the region where chips are not to be read. Flux 120 crossing through chips not in the read zones is minimized and consequently these chips may not be excited and read.

Figure 9A:
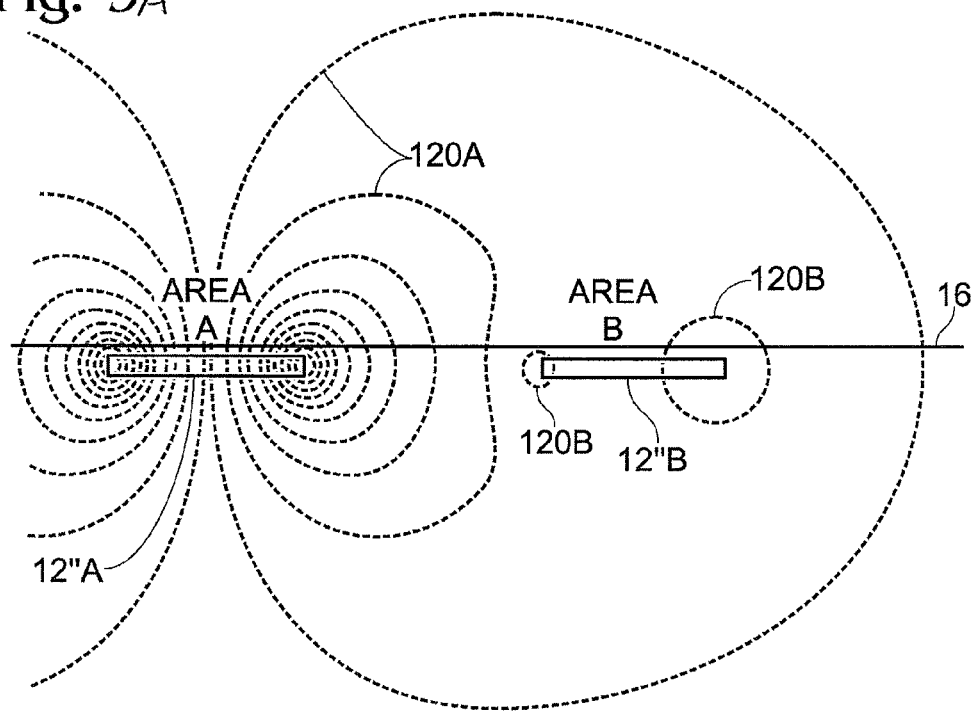
FIG. 9 is a diagram of the magnetic flux lines of two coiled inductive couplers combined in an active field shaping configuration.

In a further illustrative embodiment, shown in FIG. 9A, an active inductive coupler coils 12"A, 12"B are used under respective betting area A, B in order to shape the magnetic field. For example, suppose betting area A is being read, then active inductive coupler coil 12"A generates flux 120A. In order to shape flux 120A so that it does not extend into the adjacent betting area, here betting area B, active inductive coupler coil 12"B is used to generate a small signal in phase, and at the same frequency, as that of active inductive coupler coil 12"A, thus producing flux 120B which "pushes" flux 120A back towards betting area A. The flux cancelling loop effect in the second Active Field Control embodiment of the invention is illustrated in FIGS. 9B-9E by showing the incremental excitation of the reader 120B.

The concept of using a "flux canceller loop" is related to a property of lines of magnetic flux and how "load modulation" functions in returning signal from the RFID tag. In a coupled transformer configuration, of which the Reader-Tag system can be considered to be, the primary winding is the Reader coupler and the RFID tag coil is the secondary. Any impedance change in the secondary winding (caused by the RFID chip signaling) is "transformed" into a small back EMF in the Reader coupler which can be sensed by receiver circuitry in the Reader. This is the standard method of Tag to Reader communication in all HF RFID.

In the present invention, an in-phase reader signal is transmitted to coil 12"A in the first player position. A synchronous version of the reader signal is also directed to the flux canceller circuitry by way of line 136 (See FIG. 17, for example). The synchronous signal is attenuated and applied to the adjacent coupler loops, designated as coupler 12"B in the illustrative examples provided in FIGS. 9A-9E. The coupler loop 12"B generates a field whose lines of flux push the lines of flux from the main Reader coupler 12"A away from the chip location where the reader interrogation pulse for position A is not desired, i.e., at the adjacent position B. The lines of flux of the auxiliary field generated by coupler 12"B will intersect with the RFID chip at position B, and the chip will "load modulate" these flux lines, but it will not read the flux lines of the Reader coupler 12"A. Note also that the signal generated by the RFID chip B returns via an attenuated path and is not detected by the Reader, and hence, is not recognized.

Figure 9C:
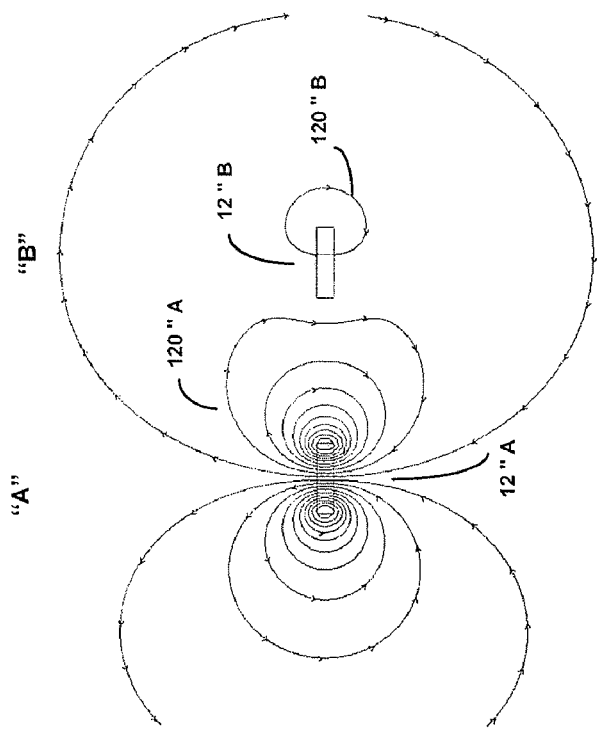
Figure 9B:
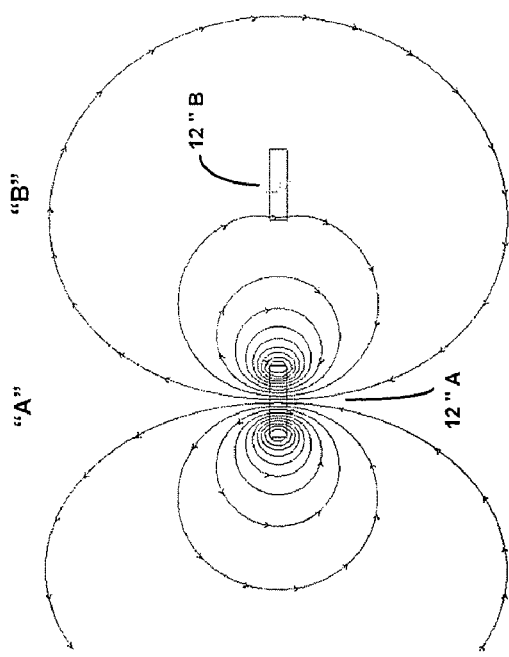

FIG. 9B shows coupler 12"B turned OFF, i.e., the synchronous attenuated signal is not being applied to the coupler 12"B. FIG. 9C and FIG. 9D show 0.1 reader excitation and 0.2 reader excitation, respectively. As the excitation increases, the "pushing effect" becomes more apparent. The magnetic flux 120"B from coupler 12"B is pushing the magnetic flux 120"A away from player position "B." In FIG. 9E, reader 12"B is experiencing a 0.5 reader excitation and the flux from reader 12"A is effectively canceled at the player position B.

Figure 10:
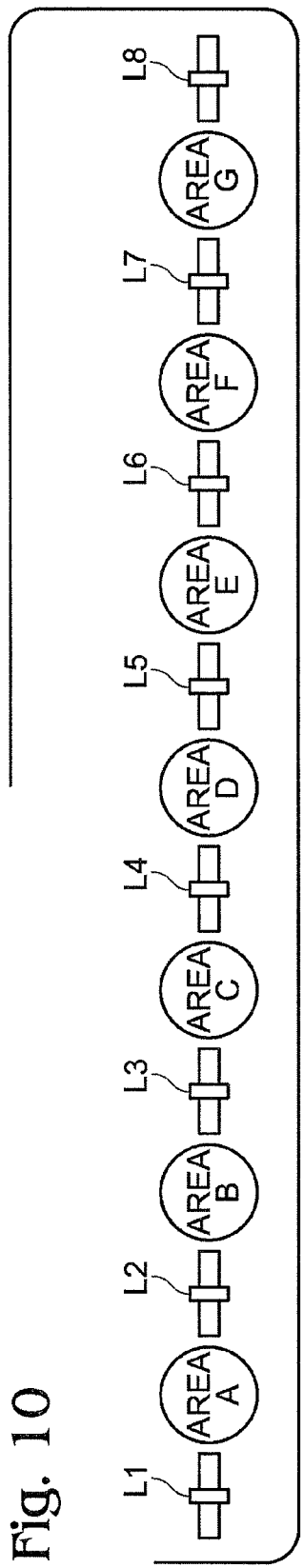
FIG. 10 is a schematic representation of the placement of ferrite solenoids under a gaming surface.

Referring to FIG. 10, several multiplexed horizontally placed ferrite solenoids, L1 though L8, are used, each interrogating only one or two betting areas at a time. For example, ferrite solenoid L2 interrogates betting areas A and B. Since the end zones contain only one betting area each, namely betting areas A and G, the exact count of chips in each of the zones may be found by logical deduction. For example, ferrite solenoid L1 reads the chips contained in betting area A, creating list A, while ferrite solenoid L2 reads the chips contained in betting areas A and B, creating list AB. To obtain the list of chips contained solely in betting area B, that is list B, it suffice to subtract list A from list AB. Similarly, list C is obtained by subtracting list B from list BC obtained when ferrite solenoid L3 reads the chips contained in betting areas B and C. This is repeated until the list of chips in each betting area is determined. It is to be understood that this method may be used with a lesser number of ferrite solenoids, for example using only ferrite solenoids L1, L2, L4, L5, L6 and L8, but ferrite solenoid L3 and L7 may be used for redundancy purposes in this case.

By introducing field measurement capability using received signal strength indication (RSSI) within the gaming chips and by knowing the exact field intensity level at each gaming chip, it is possible to calculate its distance from the device producing the magnetic field. By triangulation, i.e. by calculating the intersection of the circles situated at the distance corresponding to the measured field strength in three different field cases the exact position of the token may be determined. The three different field cases contemplated above may actually be produced, for example, by using three different devices situated in different locations or by a central device and additional devices that modify the magnetic field gradient.

Figure 11:
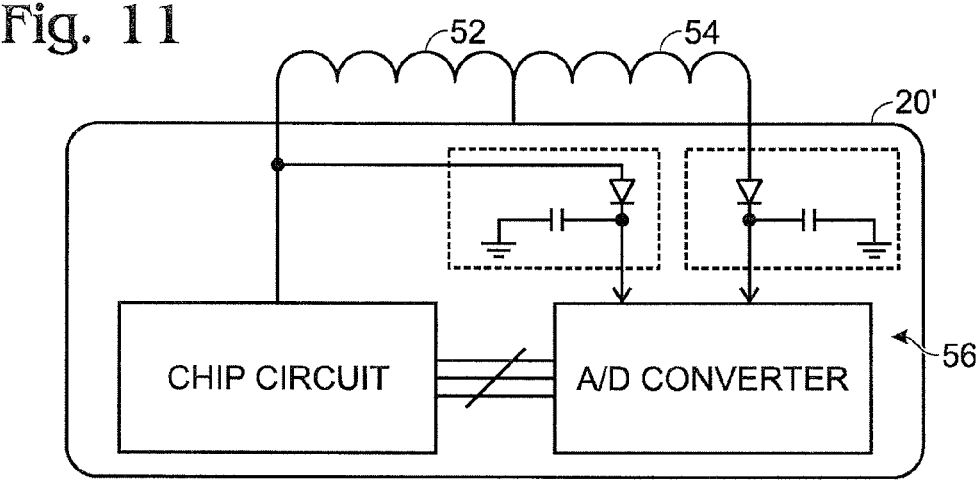
FIG. 11 is a schematic representation of the internal circuits of a modified RFID gaming chip.
Figure 12:
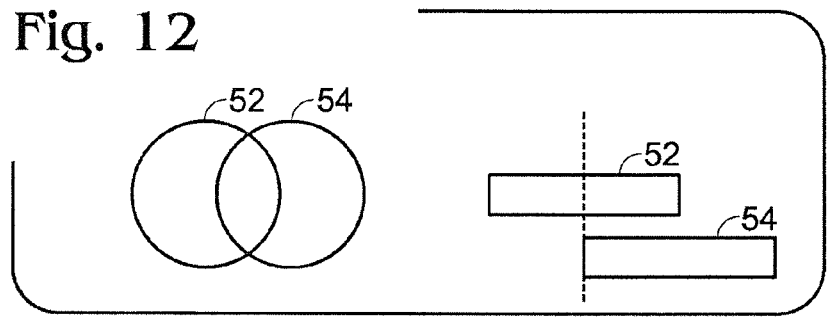
FIG. 12 is a schematic representation of the positioning of the coiled inductive couplers of the circuit shown in FIG. 11.

In a first illustrative embodiment, shown in FIG. 11, a gaming chip 20' contains two side by side overlapping inductive coupler coils 52, 54, and an RFID integrated circuit 56 capable of measuring the RSSI and communicating this measure as data along with its usual unique internal ID. The inductive coupler coils 52, 54 are overlapped, as shown in FIG. 12, in such a way as to reduce mutual inductance.

Figure 13:
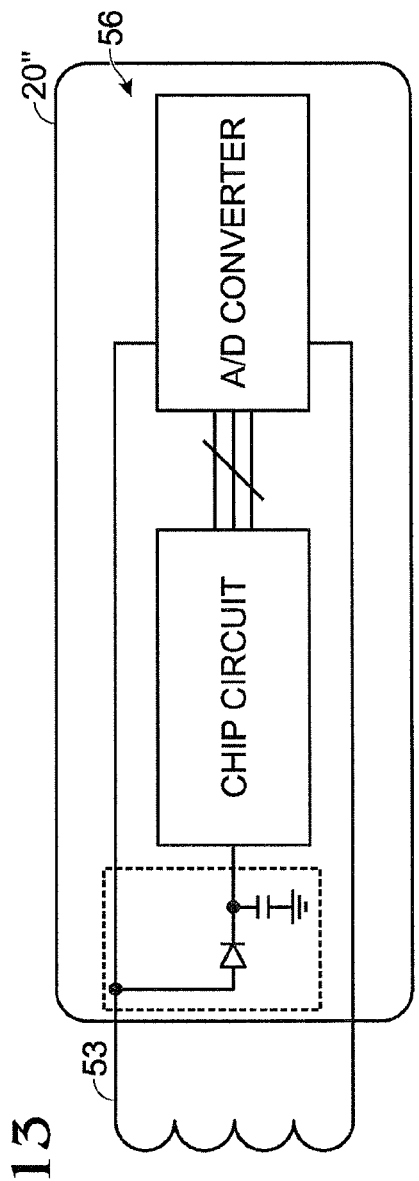
FIG. 13 is a schematic representation of the internal circuits of another modified RFID gaming chip.

In another illustrative embodiment, shown in FIG. 13, a gaming chip 20" contains a single coupler coil 53 and an RFID integrated circuit 58 capable of measuring the RSSI and communicating this measure as data along with its usual unique internal identification number (ID), is used.

To determine the position of a chip 20' containing two side by side overlapping inductive coupler coils 52, 54, the gradient of the magnetic induction field of the reader coil 12 is sensed by differencing the levels measured from each inductive coupler coil 52, 54 and dividing by their known separation distance. This gradient is then compared to calibrated radial measurements. Hence distance from the center of the betting area, which is usually circular in shape, may be determined.

The method to determine the position of a chip 20" containing a single inductive coupler coil 53 is to use the difference in RSSI as a measure of the values of the magnetic field produced by a single reader coil, which may be calibrated to the position of the gaming chip 20" on the gaming surface 16.

Figure 14:
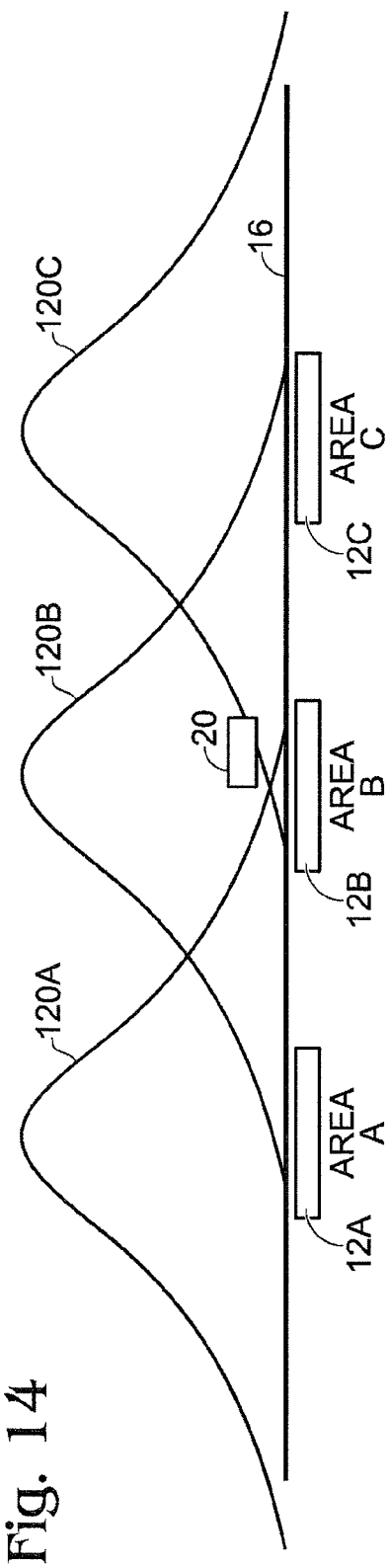
FIG. 14 is a schematic representation of the flux density profiles of adjacent coiled inductive couplers.
Figure 15:
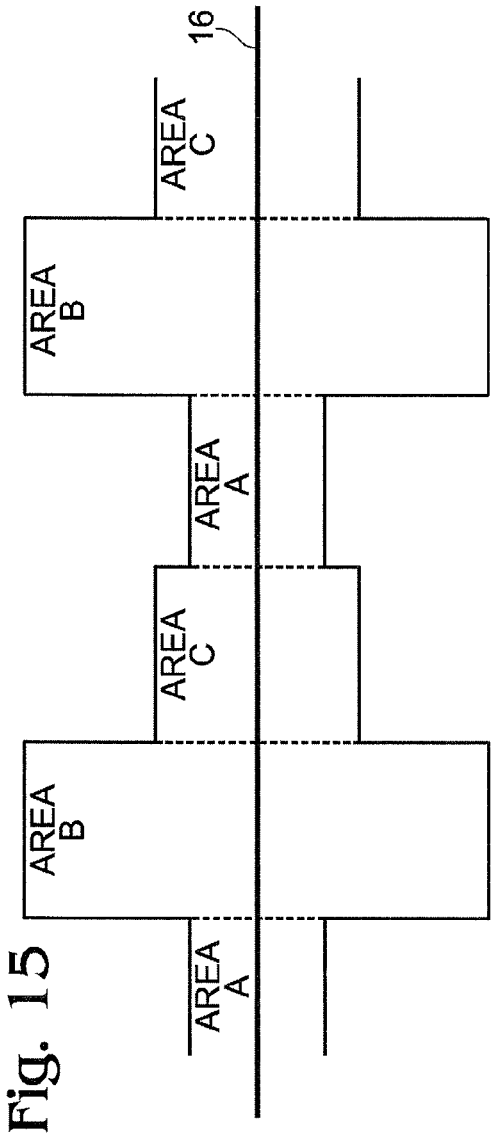
FIG. 15 is a schematic representation of the signal envelop received at each coiled inductive coupler.

Furthermore, signals from two or more interrogating read coils 12 may be used to measure the position of a chip 20. Referring to FIG. 14, chip 20 senses the relative levels of the fields 120A, 120B and 120C generated by read coils 12A, 12B and 12C, respectively, as they are sequentially energized. This data, shown in FIG. 15, may then be used to form a distance measurement from the intersection of the field patterns and may be calibrated to a position on the gaming surface 16.

Figure 16:
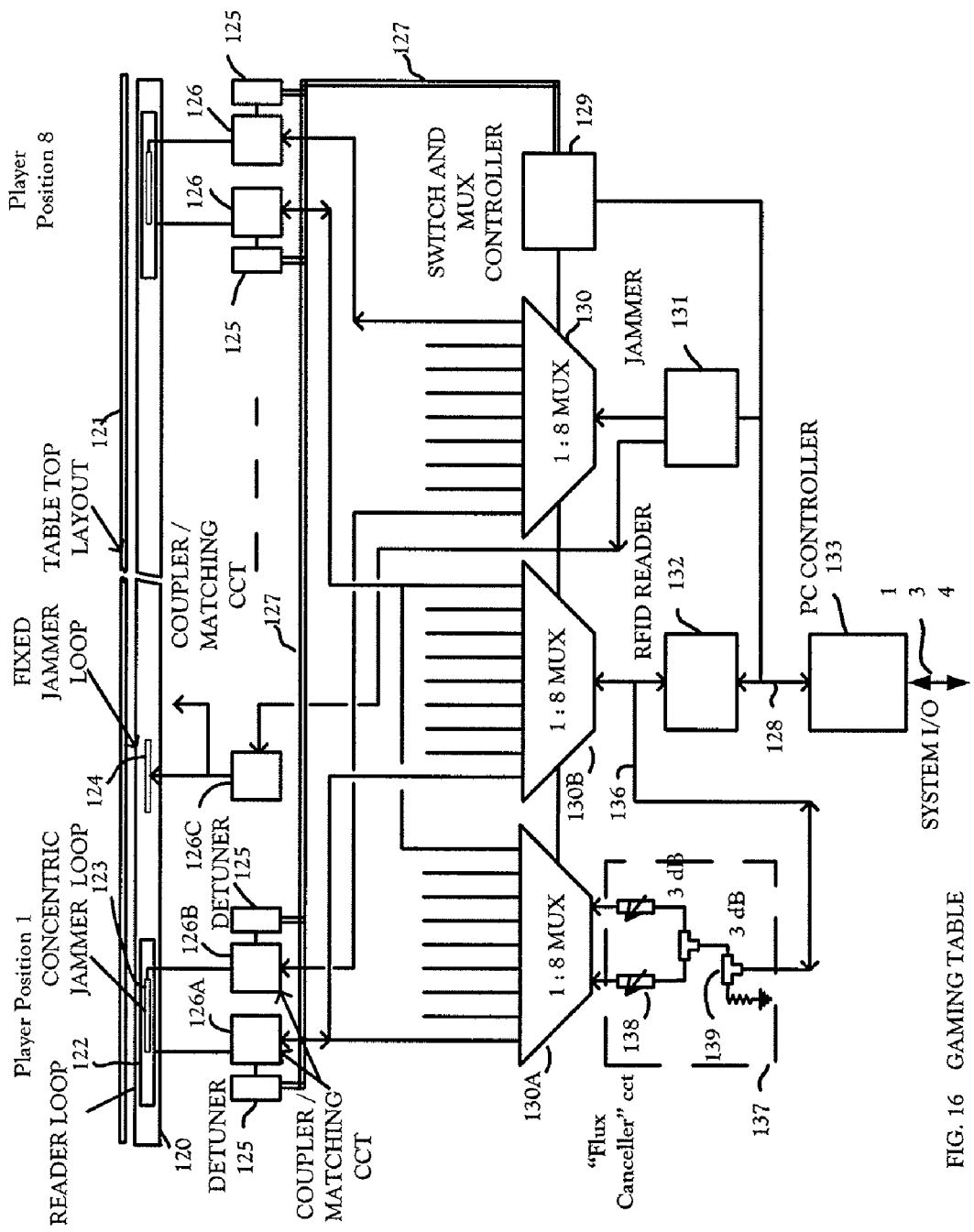
FIG. 16 is a block diagram in accordance with an embodiment of the present invention.

As embodied herein and depicted in FIG. 16, a gaming table block diagram in accordance with one embodiment of the present invention is disclosed. While FIG. 16 shows player position 1 and player position 8, those of ordinary skill in the art will understand that these numbers are arbitrary and the present invention may be applied to any gaming table arrangement including, but not limited to, Baccarat, Pai Gow poker, Black Jack, and the like. Further those skilled in the art will understand that each player position includes all of the components and sub-systems shown in player position 1.

At Player Position 1, a coupler assembly (not shown in FIG. 16) is disposed within the player position reading area within the table top 121. The coupler assembly includes reader coupler loop 122 and concentric jamming loop 123. The coupler loop arrangement may be similar to the arrangement depicted in FIG. 6. On the other hand, the gaming table may employ the arrangement previously described in FIG. 5 and the associated text. The reader loop 122 is coupled to impedance matching and reader resonance circuit 126A. In one embodiment, network 126 is implemented using a capacitive network such that couplers 122,123, and 124 are tuned to resonance at the center frequency of 13.56 MHz and adjusted for a rough impedance match to 50 Ohms. A voltage standing wave ration (VSYWR) of 2, or better, is adequate.

A detuner circuit 125 is also coupled to circuit 126A. Essentially, the detuner circuit 125 is employed to short out the resonance creating capacitor disposed in circuit 126A. Those of ordinary skill in the art will understand that when each coupler is being tuned, all adjacent couplers have a high mutual inductance because they are either co-planar to, and/ or concentric with, the main reader coupler loop 122. Because of the high mutual inductance, they must be momentarily detuned, i.e., taken out of the mutual inductance circuit, by turning the detuner switch 125 ON to short out the capacitor and momentarily incapacitate the resonant circuit. The Detuner 125 is implemented using an optically isolated PIN diode circuit. To reduce the current requirements on the PIN diode, it is placed across one of the tuning capacitors rather than in series with the loop. This effectively destroys the resonance of the loop but still leaves the loops closed.

Detuner circuit 125 is actuated by the switch and multiplexer (MUX) controller 129 via bus 127. In one embodiment, bus 127 may be implemented by a controlling parallel discrete bus. Alternatively, bus 127 may be implemented 127 by a serial multi-drop bus. For example the "One wire"™ from Dallas Semiconductor may be employed.

It should be noted that each player position includes three coupler matching circuits 126. The reader loop 122 is coupled to both the flux canceller multiplexer 130A and the RFID multiplexer 130B via matching circuit 126A. The explanation for this is apparent in light of the discussion of FIGS. 9A-9E. Concentric jamming loop 123 is coupled to jamming multiplexer 130C by way of matching circuit 126B. Finally, fixed jammer loop 124 is directly coupled to jammer 131 via matching circuit 126C. The operation of multiplexers will be apparent in the discussion of the timing diagram provided in FIG. 17. It will be apparent to those of ordinary skill in the pertinent art that modifications and variations can be made to multiplexers 103A-130C of the present invention depending on system processing speed requirements. For example, multiplexers 103A-130C may be implemented using an RF pin diode switch matrix, Power FETs or any other suitable arrangement. Multiplexers 103A-130C may also be implemented as a solid state switch in 3 planes characterized by at least 50 MHz with low insertion loss and cross talk.

As noted in the discussion of FIGS. 9A-9E, RFID reader 132 provides a reader signal to read multiplexer 130B and a synchronous read signal to flux canceller circuit 137. Flux canceller circuit 137 includes a network of 3 dB splitters configured to attenuate the synchronous read signal in the manner previously described herein.

As those of ordinary skill in the art will appreciate, RFID reader 132 may be of any suitable type. In one implementation, reader 132 is implemented using a standard commercially available programmable HF RFID medium range Reader/Interrogator configured to supply up to 4 watts of output power. Of course, the output power supply level of the present invention is programmable.

Jammer circuit 131 may be of any suitable type and configured to effectively jam the down link between the Reader 130B and RFID inlay in the chip. To accomplish this, it is necessary to either disable the front end receiving circuit in the RFID die or to prevent decoding of the modulated signal sent by the Reader. The down link signal is a very narrow band ASK modulated signal with modulation set at either 10% or 100% by the Reader. The RFID device is required to accept either. A Jamming signal for this in one implementation is a continuous wave (CW) signal of sufficient strength to cause the interference-to-signal (I/S) ratio as seen by the receiving detector to result in sufficient decode errors so that a valid command is not detected by the RFID die. Because this is an RTF system, the RFID die will not attempt to communicate with the Reader until it receives a valid command. A jamming signal in another implementation is a similar ASK modulated fixed frequency signal that will also confuse the receiver. In both these cases the Jammer is not synchronized to the Reader.

Those of ordinary skill in the art will understand that the jamming signal may be of any suitable type depending on the front end of the RFID chip, for example, the jammer modulation may include a frequency modulated signal, an amplitude modulated signal, a phase modulated signal, a noise modulated signal, a pseudo-random noise modulated signal, an FM chirp signal, or a code modulated signal. For example, the jamming signal may also include a multiple-frequency signal adapted to defeat FSK receivers. Of course, the jamming device of the present invention may be extended to the 915 MHz and/or the 5.8 GHz bands with suitable antennas.

The system of the present invention may also be implemented as an ISO 18000-3 Mode 2 compliant system. In this case, the RFID devices and Readers require a slightly different jamming circuit. The concept is the same—the RFID inlays in the gaming chips are "RTF" and will not respond unless recognizing valid Reader commands. In particular, the downlink modulation technique employed in such systems is Pulse Jitter Modulation (PJM). PJM is a form of Phase Shift Keying (PSK) that employs very small phase deviations, on the order of +−1 deg to +−2 deg from carrier. This System transmits at constant amplitude and is relatively immune from the first jamming method described above. In this embodiment, however, Jammer circuit 131 is configured to detect the Reader signal, phase lock to the carrier signal, and generate a signal slightly dithering in phase. This phase wander may be swept or alternated, but the rate is determined experimentally to be within the bandwidth of the PLL on board the RFID die. Its purpose is to disrupt the phase lock and defeat the detector from accurately following the desired Reader signal. In this instance the jamming signal must be synchronous with the Reader signal.

Again, in this embodiment, as well as the previous ASK embodiment, the RFID die within the gaming chips are configured to reject all messages from the Reader that are invalid, i.e. do not pass a cyclical redundancy check (CRC) or other such error measurements. When the error rate is sufficiently high, the CRCs are wrong and the RFID unit will not "talk."

Those of ordinary skill in the art will understand that the system depicted in FIG. 16 may employ both the flux cancellation chip resolution technique or the jamming techniques, or both systems to provide a lateral chip detection resolution between 0.25-0.50 inches.

Figure 18:
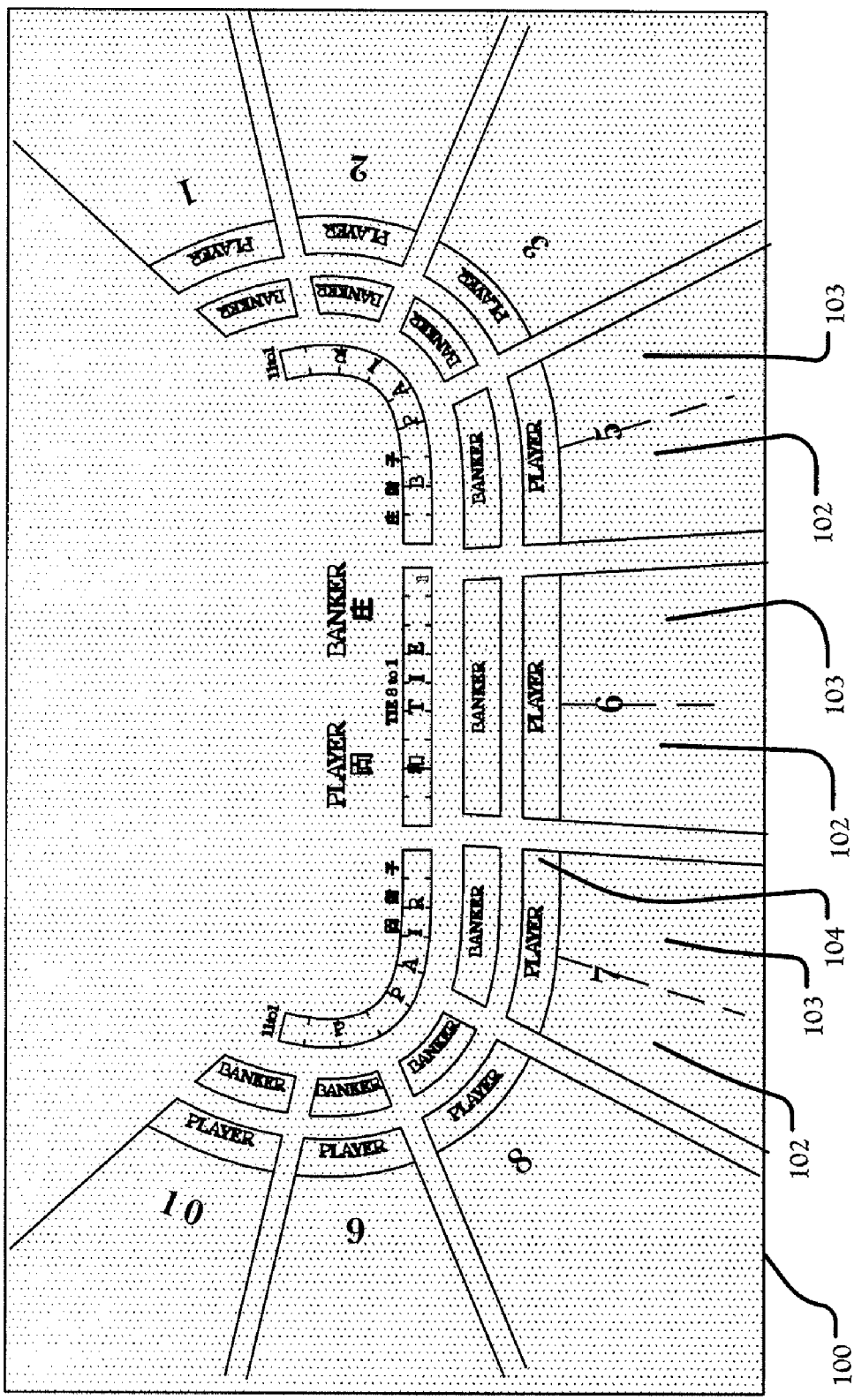

Heretofore, there has been very little explanation of fixed jamming loop 124. The gaming table layout may require other areas to be "jammed" such as the peripheries where players keep their chips. This is accomplished by fixed continuously energized jammer loops. Switching and exact level set-up of these is usually not needed. The cross-sectional view of table top 121 in FIG. 16 does not adequately illustrate the spatial separation between loops 122, 123 and fixed jamming loop 124. The coupler loops 122, 123 are disposed in reading areas, whereas jamming loop 124 is disposed in a non-reading area. Referring to the Mini-Baccarats layout depicted in FIG. 18, areas 104, 105, and 106 may be designated as reading areas. On the other hand, areas 102, 103 are player areas that, in some embodiments, are not read. Accordingly, loops 122, 123 may be disposed under areas 104, 105, and 106. The fixed jammer loop 124, while disposed in each player position, is spatially separated within that "slice" of the table, and disposed under areas 102, 103.

Figure 17:
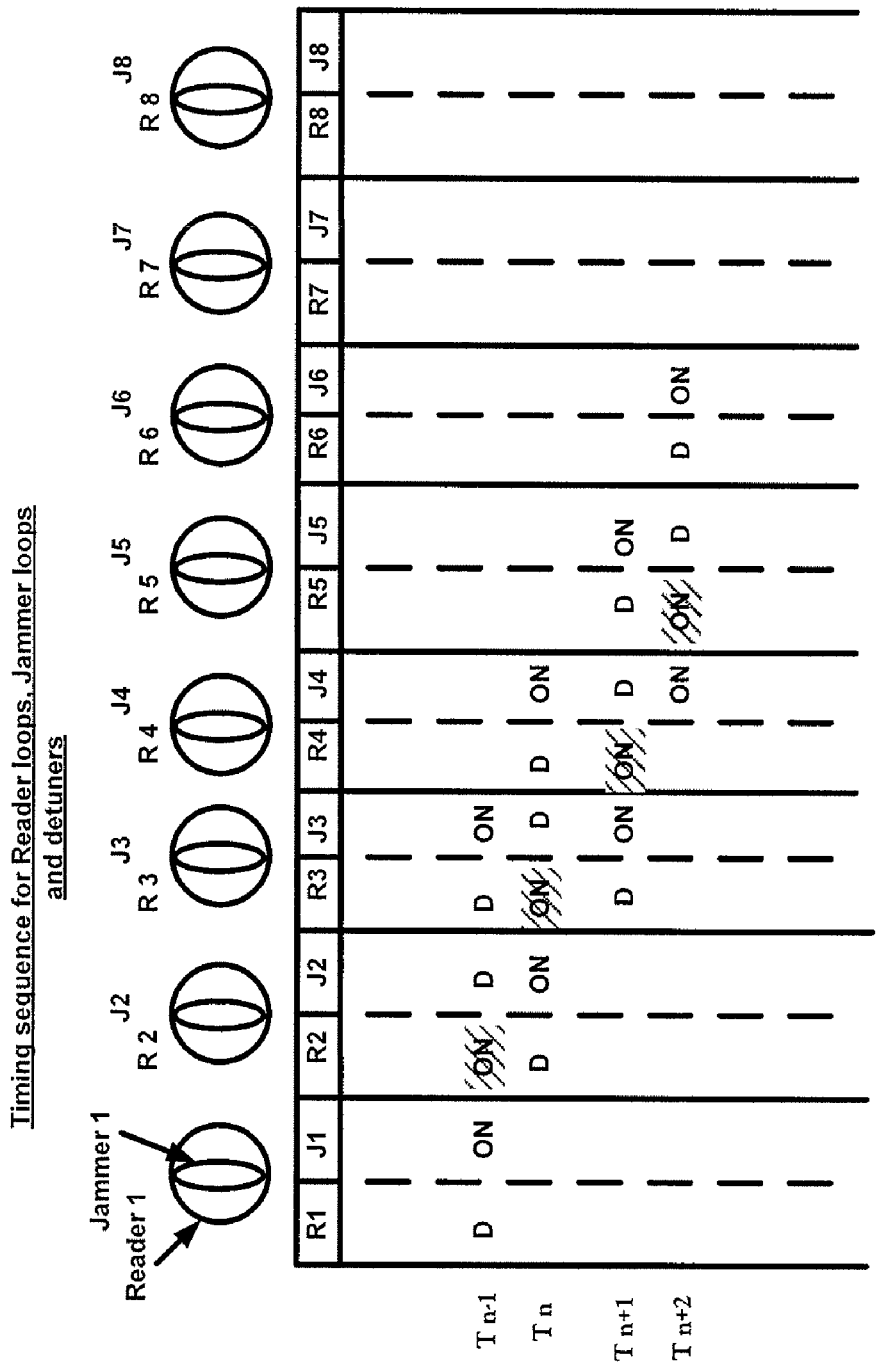
FIG. 17 is a timing diagram in accordance with an embodiment of the present invention.

Referring to both FIG. 16 and FIG. 17 once the System is tuned it is ready for operation. After initialization, RFID Reader 132 and Jammer 131 are ON, and controller 129 operates the RF MUX 130A-130C and Detuner switches 125 in accordance with the sequence in FIG. 17.

Referring to FIG. 17, the timing diagram includes time intervals $T_{n-1}$ to $T_{n+2}$ disposed along the vertical axis and a reader/jammer excitation pair Rx/Jx for each player position, wherein "x" is an integer value denoting the player position. In the example provided, at time interval $T_{n-1}$, the reader coil at position 2 is turned ON and the jamming coil is detuned associated circuit 125. To avoid cross-reading at position 1 and position 3, the jammer coils at these positions are turned ON and the reading coil detuned by the associated circuit 125. After time interval $T_{n-1}$ has elapsed, the reader at position 3 is turned ON and the jammer at this position is detuned. The adjacent positions, i.e., position 2 and position 4 have their jammers turned ON and their reader circuits detuned. This cycle repeats until each position is read.

The power level of the Reader RF signal is decreased under program control for every MUX operation to avoid spiking. For each player position, the Reader couplers are polled for all of the gaming chips in the field. The UID for each chip in the reader field is obtained using an anti-collision protocol. The UIDs obtained during this process are used to derive a chip inventory. Furthermore, each chip in the field is processed on an individual basis by one reading a one-time-password stored in the on-board memory, and re-writing a new password as needed. This action is determined by higher level networked elements of the Casino Gaming System "managing" tables. For example chips may be checked against a database for authentication. Communication to "the Network" is via 134 and is highly secured. For large tables such as 15-player Baccarat, 2 MUX systems and RFID Readers are used to increase speed of polling all player betting spots and the large quantities of chips in play.

Reference is made to PCT Patent Application No. CA 2005/001519, Published PCT Patent Application WO/2005/125078, and PCT Patent Application No. CA 2005/001338, System and Method for permitting Identification and Counting of Gaming Chips, which are incorporated herein by reference as though fully set forth in their entirety, for a more detailed explanation of the data security features employed by the present invention.

Referring to FIG. 18, a nine (9) player position mini-Baccarat gaming table in accordance with the present invention is disclosed. Those of ordinary skill in the art will understand that the present invention should not be construed as being limited to the example embodiments provided herein. In fact, the present invention is applicable to any RFID induction coupler application requiring a precise lateral resolution of an inch or less (i.e., as small as 0.25 inches). In Baccarat, numbered player areas 101 can be divided into seated and standing players ("back bettors") Area 102 is for a seated player; areas 103 is for all back betters. The casino has an interest in keeping account of the seated player betting and win-loss results since they are likely favored customers. Each player has a betting area designated Player (wins) 104; Banker (wins) 105, and Tie (wins) 106. To bet, a player will place his chip or stacks of chips in these areas. As can be seen from FIG. 18 these areas are contiguous.

Figure 19:
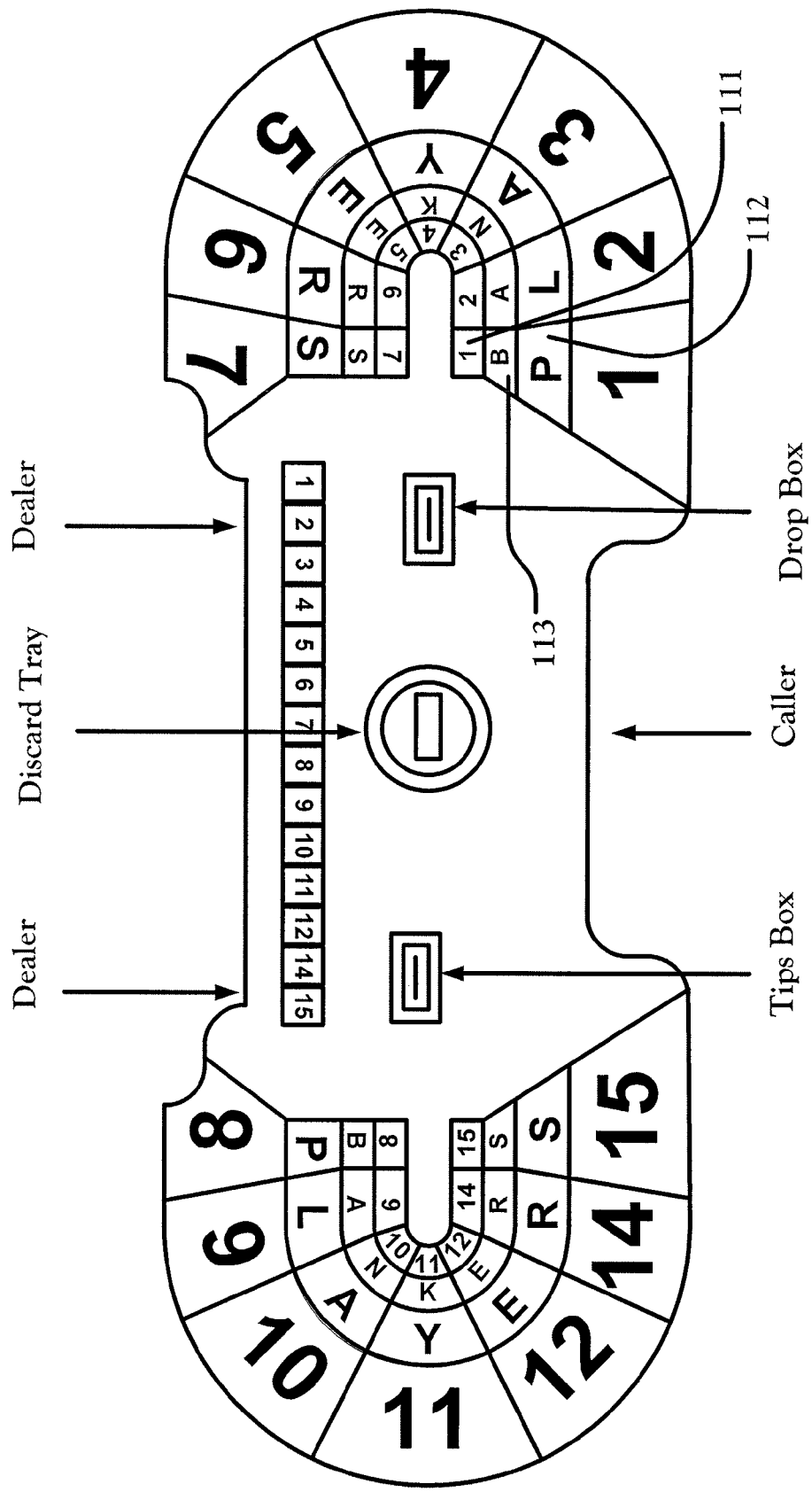

Referring to FIG. 19, a 15-player baccarat table in accordance with the present invention is disclosed. The betting areas for 15-player Baccarat are 111, 112, and 113.

Figure 20:
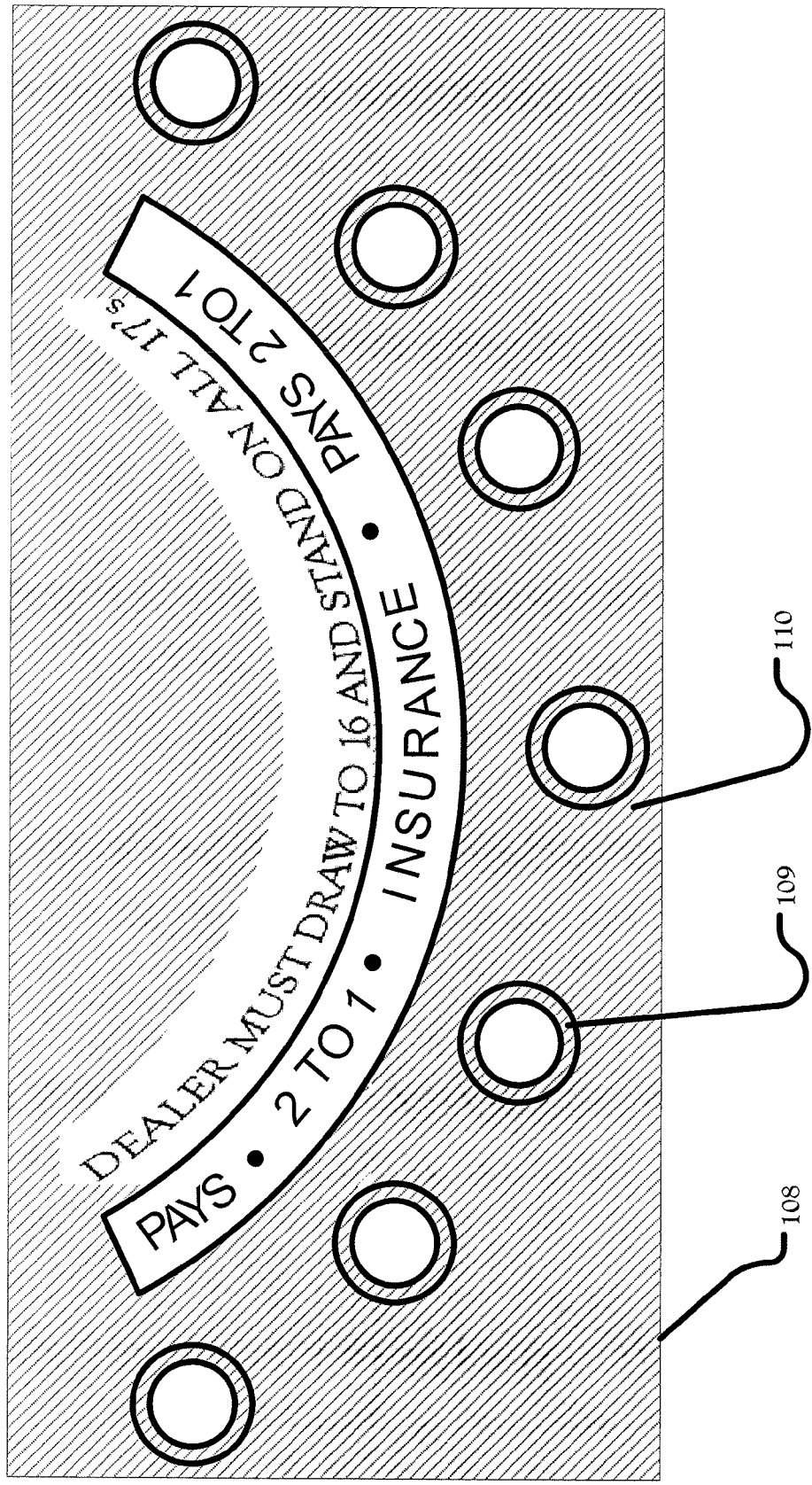

FIG. 20 shows a Black Jack table in accordance with the present invention. For a Blackjack game 108, Circular, square or other casino specific betting spots 109 are designated usually approximately 4" in diameter. Spacing will depend on the number of players/table. Seven is typically the largest table (FIG. 18). In Blackjack an implied zone 110 around each spot of approximately 1 chip diameter (1¼) on each side and touching the main spot is shown for second bets in "doubling down" or "splitting" situations.

Referring to FIG. 21, a Pai Gow Poker table in accordance with the present invention is disclosed. The betting areas 115 are the marked circular areas.

Figure 22A:
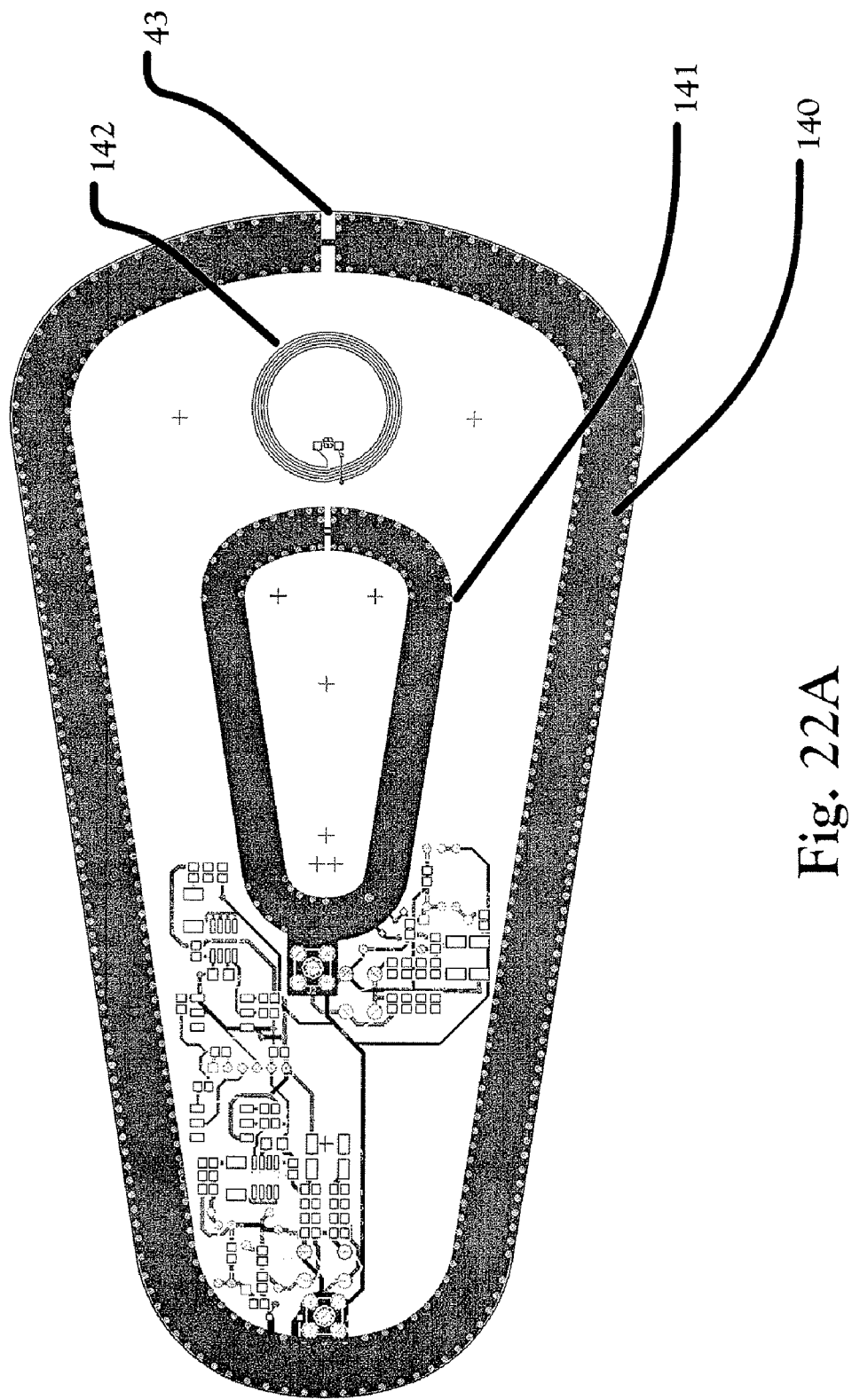
FIGS. 22A-22C are detail views of a coupler PCB in accordance with an embodiment of the present invention.
Figure 22B:
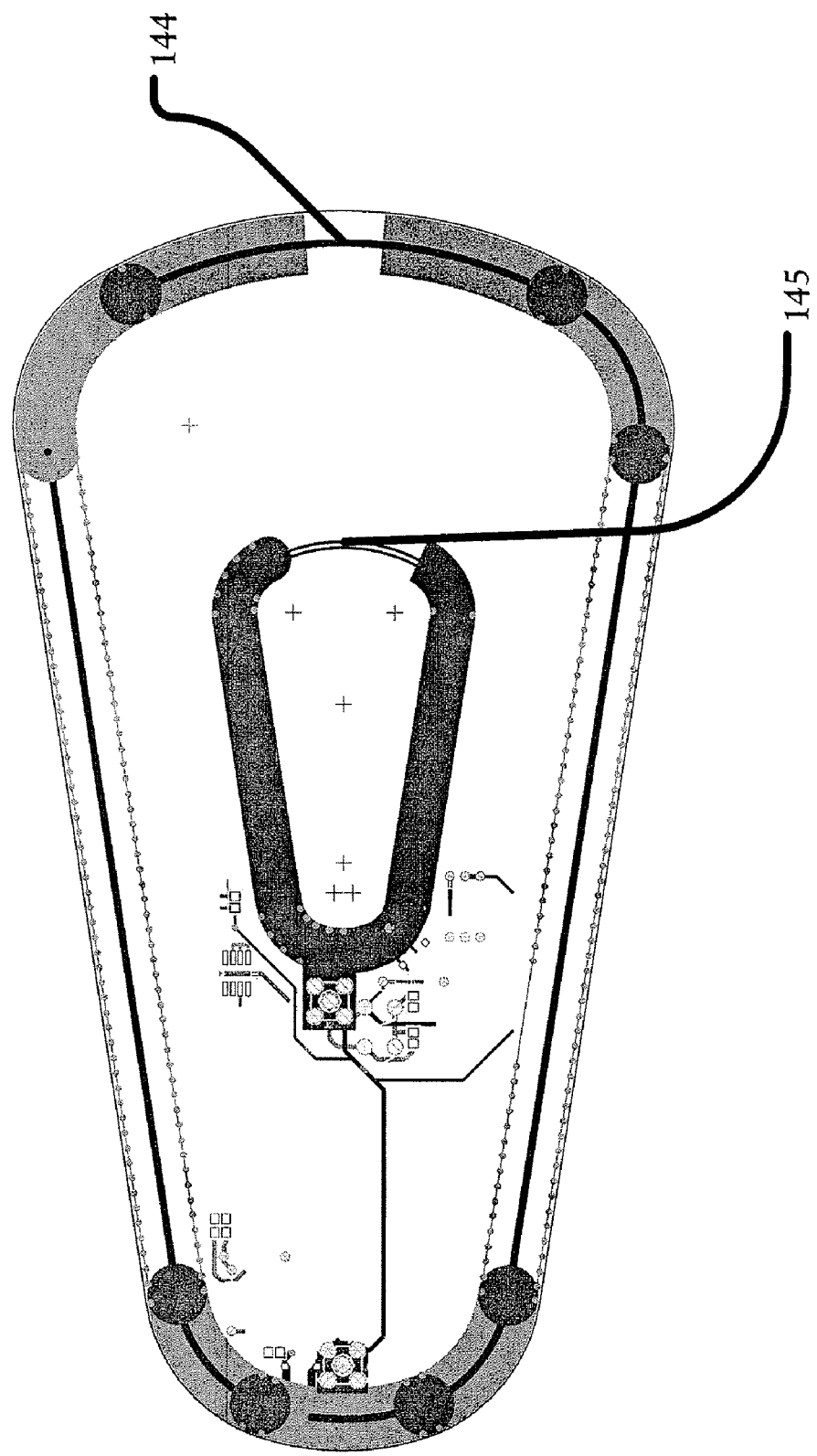
Figure 22C:
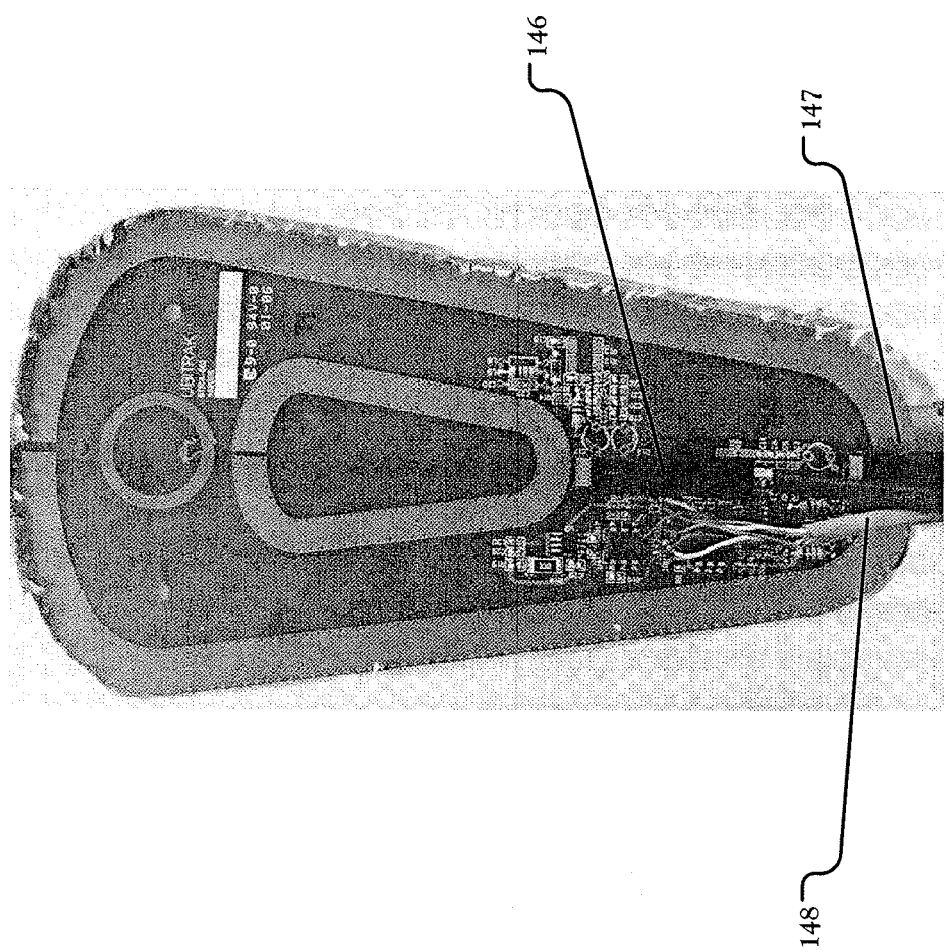

As embodied herein and depicted in FIGS. 22A-22C, a detail view of a four (4) layer printed circuit board in accordance with the present invention is disclosed. The Coupler Assembly is shown in FIG. 22C. This unit consists of a 4-layer printed circuit board containing the Reader coupler loop and the concentric jammer coupler loop. Also, the tuning and matching circuits for each loop, the detuner Pin diode switch and a small spiral coupler coil 142 are contained on this board. Element 146 is the SMB connector for the input RF cable from the Jammer 131 or flux canceller 137 signal and 147 is the SMB input RF cable connector for the Reader 132 signal send via the multiplexer unit 131.

To be able to Read chips some distance away, as a rule of thumb, the inductive loop generating the electromagnetic field must have a diameter at least equal to the distance at which chips are to be read. A feature of this design is that the coupler geometry is a "smoothed trapezoid" and not a circle as is typically used in other RFID Reader applications. The long axis is sufficient to produce an exciting field covering stacked chips of more than 20 high when the Reader power is set at slightly less than 4 watts. The trapezoidal shape is also ideally suited to the layout of the Baccarat table. The rounded shape is necessary to avoid flux crowding effects produced at the interiors of sharp corners.

Referring to FIG. 22A, the top layer artwork of the printed circuit board (PCB). A wide ground area 140 acts as an electrostatic shield for the current loop 144 on the inner layer. This minimizes the detuning affect of nearby objects and helps to limit the production of incidental far field radiation to well under the FCC (and other Jurisdictions) emission limits. This ground pattern must have a gap 143 at the top so a "shorted turn" is not formed which will rob energy by eddy current action from the desired field. The "ground" does contain mini-eddy current loops in the cross axis direction and these have a slight effect in reducing the vertical H field vector strength over the loop. This result is desired as it assists in reducing the Read field strength near the outside edge of the loop. A similar ground pattern 141 is placed over the concentric inner loop 145. In addition the same ground patterns are duplicated on the bottom layer of the PCB. The outer loop is a single turn and sized to have an inductance of approximately 0.5 micro henries which can be easily "resonated" by common surface mounted capacitors. The inner loop is a 2-turn loop.

The small spiral coil pattern 142 on the Coupler PCB is similar to the pattern of a chip inlay and with an attached RFID die is used as a "reference chip" for the Coupler Assembly. This circuit will act as another chip in the field of the chips sensed for each player position and is used to get an absolute confirmation that the multiplexer is switched to the correct player position during the polling sequence. To do this, the Unique Identifying number of each Coupler Assembly is associated with the player position and known by the controlling PC 133. In another implementation this chip contains a die that is compatible with ISO 18000-3 which contains an excitation level sensing circuit. This is output as a 4 TEL bits with a 2 dB resolution in a preamble message to the Reader when queried. This information can be used by the PC and Reader in an adaptive feed back fashion to set the required excitation and jamming field levels since the sensing circuit can pick up either Reader or jammer fields.

FIG. 22B shows the coupler PCB inner layer. Outer loop 144 is an implementation of the reader loop (122) depicted in FIG. 16. Inner loop 145 is an implementation of the concentric jamming loop (123) shown in FIG. 16.

FIG. 23 shows a view of the table inner assembly 150 before the top surface 121 is installed. It shows the variable spacing of the Coupler Assemblies to be congruent with the Baccarat layout of the gaming surface. The position number e.g. "position 7" 151 is shown. The betting spots are 155, 156 and 157. In this example the Couplers are designed to sense total bets by the player as this is what the casino operator desired. Similar implementations with more couplers are possible using the same design principles disclosed herein to differentiate "Player, Banker, and Tie" bets.

Couplers may be placed virtually adjacent to each other and result in the System being able to accurately include a chip with a lateral distance accuracy of better than ½ chip diameter (0.5"). Note placement 153 illustrates an example of tight spacing.

The flux canceller circuitry may also be implemented using the coupler PCB and may be fed with Reader and Field Canceller signals in the polling sequence. Either loop can be used as a field canceller depending on the zones of read blockage required. An illustration of the principle of field cancelling is shown in FIGS. 9A-9E. Loop "A" the Read loop, and loops B the canceller loop, is shown in cross section and lines of flux are generated when the loops are excited with current. The "B" loop must be driven exactly in phase with the "A" loop. Chips are stacked on top of both "A" and "B". Because the "A" field extents over and through the "B" zone the chips there are likely to be read. As the "B" (Aux) current level is gradually increased the affect on the "A" lines of flux can be seen. The "A" flux is expelled or cancelled and the "B" flux grows at FIG. 9A panel 4 with Aux=0.5, nearly all the "A" flux is expelled. In an actual set-up a level of 0.2 of the Reader excitation is shown to be adequate.

A responding chip will modulate the lines of flux passing through it. This disturbance is "felt" at the generating loop. If the chip only modulates the lines from B as in panel 3 or 4, its signal is sent back to the Reader along a path with attenuation. Other chips closer to "A" are sensed by loop "A" and sent back the Reader along a non-attenuated path. The very weak signals from "B" are below the Reader threshold and not recognized. Hence undesired responses from Chips over "B" are effectively blocked.

The above example is for Baccarat which requires the tightest geometric control and the System contains examples of all the elements.

For a Blackjack System a jamming implementation is preferred and the Coupler geometry is one of an oval or race track loop shape extending slightly beyond the betting spot along the 12 o'clock-6 o'clock axis. A concentric jammer loop is also used. Other geometries are considered similar and the jammer loops may be placed outside of the main Reader loops.

For simpler game layouts such as Pai Gow Poker; close in jammers or cancellers may not be required. Fixed areas are jammed to avoid picking up players' stacks of chips not in play.

The principles and circuit designs of this invention for gaming tables may also be applied to other HF RFID smart shelf applications where the presence of an object and its' ID in a location must be known. This may be applicable for liquid filled bottles such as perfume bottles since 13.56 MHz inductive coupled RFID is known to be well suited for liquids.

Figure 24:
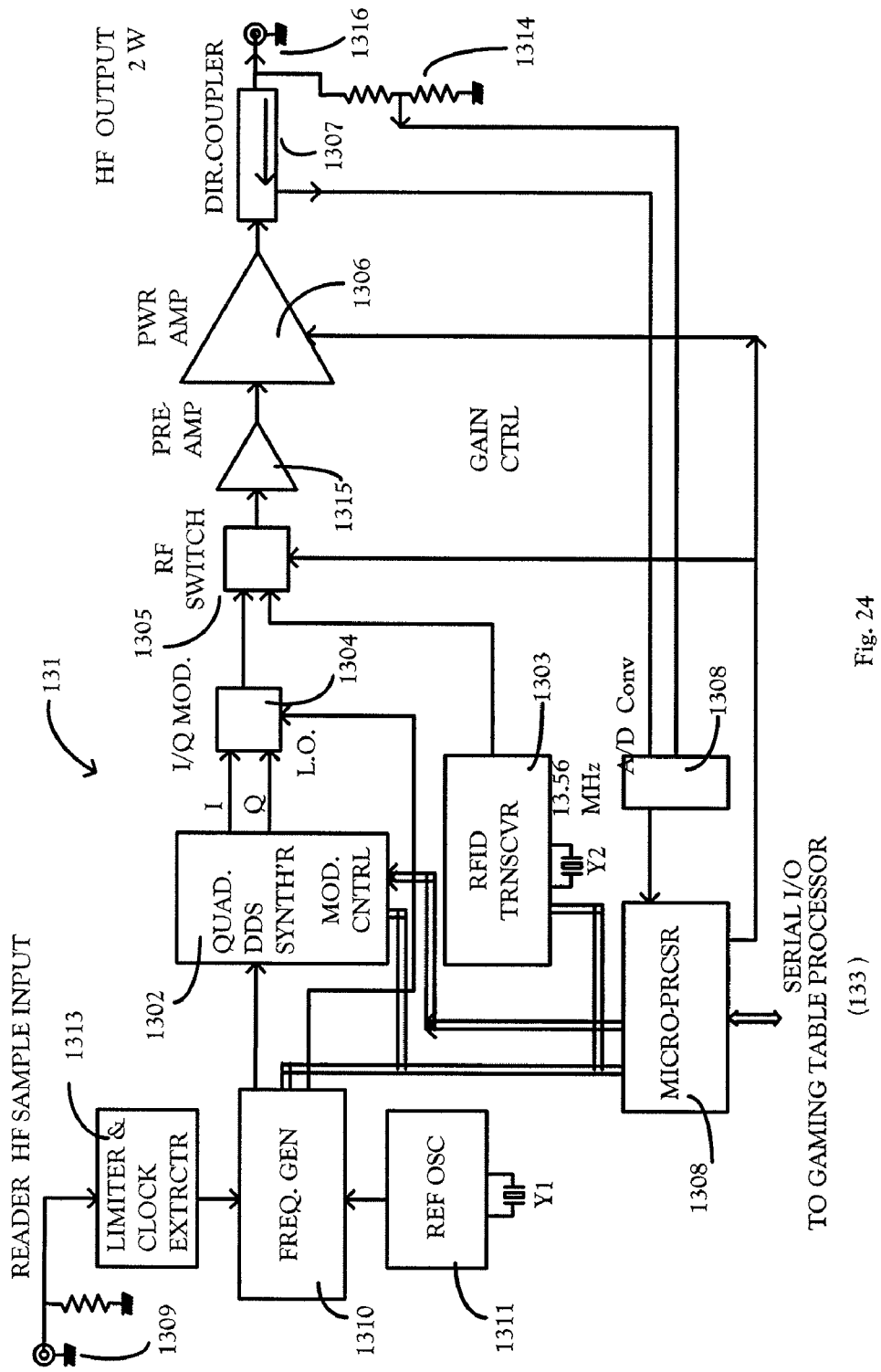
FIG. 24 is a block diagram of the jammer circuit depicted in FIG. 16.

As embodied herein and depicted in FIG. 24, a block diagram of the jammer circuit 131 depicted in FIG. 16 is disclosed. Before discussing the various elements in the circuit, it is important to note that there are situations where it is necessary to accurately account for RFID tags in one area and not in adjacent areas. In a typical sorting application, the RFID tagged objects are singulated in a conveyor mechanism and presented in the tag read zone one-by-one for identification and sorting. High accuracy is essential. The RFID technology of choice in the aforementioned sorting applications is 13.56 MHz HF inductive coupled tags. One reason for this relates to the restricted reading range of the Reader/Interrogator field. However field restricting measures such as conductive metal areas, field control loops, ferrite pieces or similar approaches are either expensive or reduce power from the Interrogator field by eddy current losses in "shorted turns." In many instances it is desirable to use low power Reader/Interrogators, in the order of 250 milliwatts. Accordingly, minimizing power loss is an important consideration in any design.

Tag jammers have been designed to prevent Readers from surreptitiously reading tags. These jammers use various signals and spoofing communications to disrupt the operation of such Readers and have been developed to accommodate consumer privacy concerns.

Since all RFID devices operating in accordance with ISO/IEC 14442, ISO/IEC 15693, and ISO/IEC 18000-3 (mode 1 and mode 2) operate in accordance with the "Reader-talks-first" principle, i.e., the RFID tag only responds when commanded, it is feasible to jam the down link from Reader to Tag to stop the Tag from responding.

Referring to 24, jammer circuit assembly 131 may be implemented and packaged on a single printed circuit board. For simplicity and clarity of illustration, conventional power supplies and conventional filter circuit details are not shown. The Jammer must have sufficient filtering, waveform shaping and operating duty cycle limitations to comply with FCC, or other jurisdictional, emission requirements.

Jammer 131 includes a clock extractor circuit 1313 coupled to 50 ohm (HF sample) input 1309. The extracted clock signal is directed to frequency generator 1310. Frequency generator 1310 receives a reference signal from oscillator circuit 1311. A reference clock signal is provided to direct digital synthesizer (DDS) circuit 1302. DDS 1302 is configured to provide an in-phase signal (I) and a quadrature (Q) signal to modulator 1304. The DDS 1302 input to the RF switch is selected when the jamming waveform must be synchronized to the "victim" carrier signal. The I/Q modulator 1304 output is provided to RF switch 1305. The RF switch also receives an input from RFID transceiver 1303. Thus, RF switch 1305 may select between two jamming signal sources, i.e., the output of RFID 1303 and the output of I/Q modulator 1304.

RFID 1303 may be implemented using a commercial RFID transceiver. In this instance, the basic output of the transmitter portion of the RFID transceiver 1303 is employed. Those of ordinary skill in the art will understand that any suitable RFID transceiver may be employed, but there is shown by way of example a device manufactured by EM Microelectronic, RFID transceiver EM 4094. DDS Synthesizer 1302 may also be implemented using any suitable device such as DDS synthesizer AD9854ASQ manufactured by Analog Devices. DDS 1302 is typically controlled by microcontroller 1312 and directed to generate one of a large variety of modulated signals, as well as fixed frequency, swept frequency, or "chirped" carriers. Microcontroller 1312 also selects which jammer source to use by operating switch RF switch 1305 and setting the level of the output from the power amplifier 1306.

For jamming waveforms that must be synchronized to the "victim" carrier signal, a sample of a Reader/Interrogator output signal may be directly connected to 50 ohm input 1309. In another implementation the input circuit can be a resonant tuner for a small inductive coupler loop designed to capture the Reader/Interrogator signal through the "air". Some care must be taken to position this pick-up loop in a region of space that will not be exposed to the jammer output signal.

The output of RF switch 1305 is directed into pre-amp 1315. After the output is amplified, it is subsequently directed into power amplifier 1306. The amplified output is directed into directional coupler 1307. As those of ordinary skill in the art will appreciate, a coupler is a four port device that is often used to provide an attenuated sample of the RF output for signal monitoring. The majority of the incident signal is thus provided to output 1316.

The output 1316 of the jammer is typically implemented as a 50 ohm source that is connected to an appropriate inductive loop configured to generate the jamming field. Two output samples are directed back to microcontroller 1312 via A/D converter 1308. As noted above, one output sample is directed to the microcontroller 1312 from the directional coupler 1307. A second sample is directed from divider circuit 1314. Microcontroller 1312 uses the output samples to detect any impedance mismatch to the output loop, provide a warning signal, and reduce the output power level if the VSWR is too high. The direct feed back path from the resistor divider 1314 is also used in a self test mode to verify correct Jammer operation.

The equipment and methods disclosed herein can be adapted to other situations where it is possible to position optical sensors closely adjacent to the object or multiple objects whose presence and ID must be determined and where a few inches of space is available to install the HF RFID coupling coils. Examples include but not limited to: perfume bottles on retail display shelves; wine bottles; test tubes or other biological sample holders in racks, jewelry or diamonds in bags or on holders, chess pieces on a board, etc.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A system for reading at least one object having a programmable RFID device embedded therein, the object being disposed in a predetermined reading region, the system comprising:
    a reader loop disposed in the predetermined reading region, the reader loop being configured to transmit a reader interrogation signal to the at least one object disposed in the predetermined reading region and receive an RFID signal from the at least one object in response to the reader interrogation signal; and
    a jamming device disposed proximate the reader loop, the jamming device being configured to generate a jamming signal that prevents an external reader device disposed outside the predetermined reading region from interrogating the at least one object disposed in the predetermined reading area.

2. The system of claim 1, wherein the jamming device is configured to generate the jamming signal in response to a jamming timing signal, the timing signal substantially coinciding with a transmission of a read signal from the external reader device disposed outside the predetermined reading area.

3. The system of claim 2, wherein the jamming timing signal is asynchronous relative to the read signal.

4. The system of claim 2, wherein the jamming timing signal is synchronous relative to the read signal.

5. The system of claim 1, wherein the jamming signal destructively interferes with an interrogation signal from the external reader device such that the interrogation signal does not substantially propagate inside the predetermined reading area.

6. The system of claim 1, wherein the jamming signal is configured to prevent the at least one object from detecting and/or responding to an interrogation signal from the external reader device.

7. The system of claim 6, wherein the jamming signal is an ASK modulated fixed frequency signal.

8. The system of claim 6, wherein the jamming signal is a continuous wave signal propagating at a frequency substantial equal to a frequency of the reader interrogation signal.

9. The system of claim 6, wherein the jamming signal is a continuous wave signal propagating at a frequency slightly offset from the frequency of the reader interrogation signal at an edge of an FCC allowed carrier band.

10. The system of claim 6, wherein the jamming signal is a phase modulated signal.

11. The system of claim 1, wherein the jamming signal is selected from a group of jamming signals including a frequency modulated signal, an amplitude modulated signal, a phase modulated signal, a noise modulated signal, a pseudo-random noise modulated signal, an FM chirp signal, or a code modulated signal.

12. The system of claim 1, wherein the jamming device includes a jamming coil disposed adjacent to the reader loop.

13. The system of claim 1, wherein the jamming device is a jamming coil disposed inside the reader loop.

14. The system of claim 13, wherein the reader loop and jamming coil are characterized by a geometry including circular, oval or rectangular geometries, and wherein the jamming coil is coplanar and co-axial to the reader loop, the jamming coil being disposed inside the reader loop.

15. The system of claim 1, wherein the jamming device includes a ferrite solenoid device.

16. The system of claim 1, wherein the jamming device includes a flux canceller loop.

17. The system of claim 1, wherein the at least one object includes at least one gaming chip, and wherein the predetermined reading region includes a gaming table, the at least one gaming chip being disposed on a surface of the gaming table, the reader loop and the jamming device being disposed under the surface of the gaming table.

18. The system of claim 17, wherein the gaming table is selected from a group of gaming tables including a baccarat gaming table, a Black Jack gaming table, a Pai Gow gaming table.

19. The system of claim 17, wherein the at least one gaming chip includes a plurality of gaming chips disposed in the predetermined reading region.

20. The system of claim 19, wherein the external reader device disposed outside the predetermined reading region is disposed in an adjacent reading region on the gaming table.

21. The system of claim 17, wherein the at least one gaming chip includes an American style gaming chip, a European style jeton gaming chip and/or a rectangular plaque.

22. The system of claim 1, wherein the predetermined reading region includes a retail display structure.

23. The system of claim 1, wherein the predetermined reading region includes a rack and the at least one object is a bottle, a test tube, and/or a biological sample holder.

24. The system of claim 1, wherein the predetermined reading region includes a chess board and the at least one object includes at least one chess piece.

25. The system of claim 1, wherein the at least one object includes jewelry or a tagged jewelry holder.

26. The system of claim 1, further comprising an RFID reader coupled to the reader loop, the RFID reader being configured to decode the RFID signal.

27. An RFID sensor system for reading at least one object having a programmable RFID device embedded therein, the at least one object being disposed in at least one of N -predetermined reading regions, N being an integer value greater than or equal to two, the system comprising:

N-RFID reader arrays, each N-RFID reader array being disposed in a corresponding one of the N-predetermined reading regions, an $M^{th}$ RFID reader array of the N-RFID arrays including an $M^{th}$ reader loop configured to read the at least one object disposed in an $M^{th}$ region and an $M^{th}$ jamming device disposed proximate the $M^{th}$ reader loop, the $M^{th}$ jamming device being configured to generate a jamming signal that prevents reader loops disposed in adjacent reading regions of the N-predetermined reading regions from reading the at least one object disposed in the $M^{th}$ region, M being an integer value in a range of integers from 1 to N; and a control system coupled to the N-RFID reader arrays, the control system being configured to energize each reader loop in accordance with a predetermined reading sequence and energize each jamming device in accordance with a predetermined jamming sequence.

28. The system of claim 27, wherein the control system is configured to energize at least one jamming device in at least one region adjacent to the $M^{th}$ region when energizing the $M^{th}$ reader loop.

29. The system of claim 28, wherein the at least one region adjacent to the $M^{th}$ region includes an $M-1^{th}$ region and an $M+1^{th}$ region.

30. The system of claim 27, wherein the predetermined reading sequence and the predetermined jamming sequence are synchronous.

31. The system of claim 27, wherein the predetermined reading sequence and the predetermined jamming sequence are asynchronous.

32. The system of claim 27, wherein each N-RFID reader array is an HF RFID coupler array.

33. The system of claim 27, wherein the N-predetermined reading regions include N -predefined positions on a gaming table, each of the N-RFID reader arrays being proximately disposed under the N-predefined positions.

34. The system of claim 33, wherein the gaming table is selected from a group of gaming tables including a baccarat gaming table, a Black Jack gaming table, a Pai Gow gaming table.

35. The system of claim 33, wherein the at least one object includes at least one gaming chip.

36. The system of claim 35, wherein the at least one gaming chip includes a plurality of gaming chips disposed in the at least one of the N-predetermined reading region.

37. The system of claim 27, wherein each jamming device in each of the N-RFID reader arrays is configured to generate a jamming signal in response to a jamming timing signal from the control system, the jamming timing signal substantially coinciding with a transmission of a read timing signal from the control system, the read timing signal configured to energize a reader loop disposed in an adjacent region of the N-predetermined reading regions.

38. The system of claim 37, wherein the jamming timing signal is asynchronous relative to the read timing signal.

39. The system of claim 37, wherein the jamming timing signal is synchronous relative to the read timing signal.

40. The system of claim 27, wherein the jamming signal destructively interferes with a reader interrogation signal generated by one of the $M^{th}$ reader loop disposed in a region adjacent to the $M^{th}$ region such that the interrogation signal does not substantially propagate inside the $M^{th}$ region.

41. The system of claim 27, wherein the jamming signal is configured to prevent the at least one object from detecting and/or responding to a reader interrogation signal generated by one of the $M^{th}$ reader loop disposed in a region adjacent to the $M^{th}$ region.

42. The system of claim 41, wherein the jamming signal is an ASK modulated fixed frequency signal.

43. The system of claim 41, wherein the jamming signal is a continuous wave signal propagating at a frequency substantially equal to a frequency of the reader interrogation signal.

44. The system of claim 41, wherein the jamming signal is a continuous wave signal propagating at a frequency slightly offset from the frequency of the reader interrogation signal at an edge of an FCC allowed carrier band.

45. The system of claim 41, wherein the jamming signal is a phase modulated signal.

46. The system of claim 41, wherein the jamming signal is selected from a group of jamming signals including a frequency modulated signal, an amplitude modulated signal, a phase modulated signal, a noise modulated signal, a pseudo-random noise modulated signal, an FM chirp signal, or a code modulated signal.

47. The system of claim 27, wherein the $M^{th}$ jamming device disposed in at least one of the N-RFID reader arrays includes a jamming coil disposed inside a reader loop.

48. The system of claim 47, wherein the reader loop and jamming coil are characterized by a geometry including circular, oval or rectangular geometries, and wherein the jamming coil is coplanar and co-axial to the reader loop, the jamming coil being disposed inside the reader loop.

49. The system of claim 27, wherein the jamming device includes a ferrite solenoid device.

50. The system of claim 27, wherein the jamming device includes a flux canceller loop.

51. The system of claim 27, further comprising at least one fixed RFID device coupled to the control system and configured to monitor the jamming signal and determine a jamming device effectiveness, the at least one fixed RFID device adaptively setting relative levels of the jamming signal and reader loop read signals in accordance with the jamming device effectiveness.

52. The system of claim 51, wherein the at least one fixed RFID device includes a plurality of fixed RFID devices configured to adaptively set by sensing the jamming device effectiveness on fixed chips permanently installed in various locations within a gaming table surface and controlling the level of the jamming signal and reader loop read signals either on initial set-up or periodically during use.

53. The system of claim 27, wherein the $M^{th}$ jamming device disposed in at least one of the N-RFID reader arrays includes a jamming coil disposed adjacent to the $M^{th}$ reader loop.

* * * * *

UNITED STATES PATENT AND TRADEMARK OFFICE
CERTIFICATE OF CORRECTION

PATENT NO. : 7,612,675 B2  Page 1 of 1
APPLICATION NO. : 11/674736
DATED : November 3, 2009
INVENTOR(S) : Miller et al.

It is certified that error appears in the above-identified patent and that said Letters Patent is hereby corrected as shown below:

Please correct the typographical errors as follows:

In claim 36, column 18, line 61, replace "region" with -- regions --

In claim 40, column 19, line 9, replace "loop" with -- loops --

In claim 41, column 19, line 15, replace "loop" with -- loops --

Signed and Sealed this

Second Day of February, 2010

David J. Kappos
*Director of the United States Patent and Trademark Office*